(12) United States Patent
Sakurai et al.

(10) Patent No.: US 6,369,794 B1
(45) Date of Patent: Apr. 9, 2002

(54) OPERATION INDICATION OUTPUTTING DEVICE FOR GIVING OPERATION INDICATION ACCORDING TO TYPE OF USER'S ACTION

(75) Inventors: Yasuhiro Sakurai, Nishinomiya; Ryuji Inoue, Toyonaka, both of (JP)

(73) Assignee: Matsushita Electric Industrial Co., Ltd., Kadoma (JP)

( * ) Notice: Subject to any disclaimer, the term of this patent is extended or adjusted under 35 U.S.C. 154(b) by 0 days.

(21) Appl. No.: 09/389,620

(22) Filed: Sep. 3, 1999

(30) Foreign Application Priority Data

Sep. 9, 1998 (JP) ............................................ 10-254787

(51) Int. Cl.[7] ................................................ G09G 5/00
(52) U.S. Cl. .................................. 345/156; 379/433.04
(58) Field of Search ................................. 345/156, 157, 345/158; 382/276, 280; 379/433.04

(56) References Cited

U.S. PATENT DOCUMENTS 4,988,981 A * 1/1991 Zimmerman et al. ....... 340/709
5,736,976 A * 4/1998 Cheung ....................... 345/168
6,005,548 A * 12/1999 Latypov et al. ............. 345/156
6,222,523 B1 * 4/2001 Harvill et al. ............... 345/156

FOREIGN PATENT DOCUMENTS

JP             06004208           1/1994

* cited by examiner

Primary Examiner—Richard Hjerpe
Assistant Examiner—Ronald Laneau
(74) Attorney, Agent, or Firm—Wenderoth, Lind & Ponack, L.L.P.

(57) ABSTRACT

A motion detecting unit detects a motion of an operation indication outputting device. A motion analyzing unit analyzes a direction, strength, and number of occurrence of the detected motion. A user action analyzing unit analyzes a type of a user's action by obtaining a frequency distribution from the detected motion. An operation determining unit includes a storing unit which stores operation indications that each correspond to a type of the user's action and a direction and other attributes of a motion of the operation indication outputting device caused by the user's action, and outputs an operation indication corresponding to the analysis results by the motion analyzing unit and user action analyzing unit to an information processing apparatus.

20 Claims, 22 Drawing Sheets

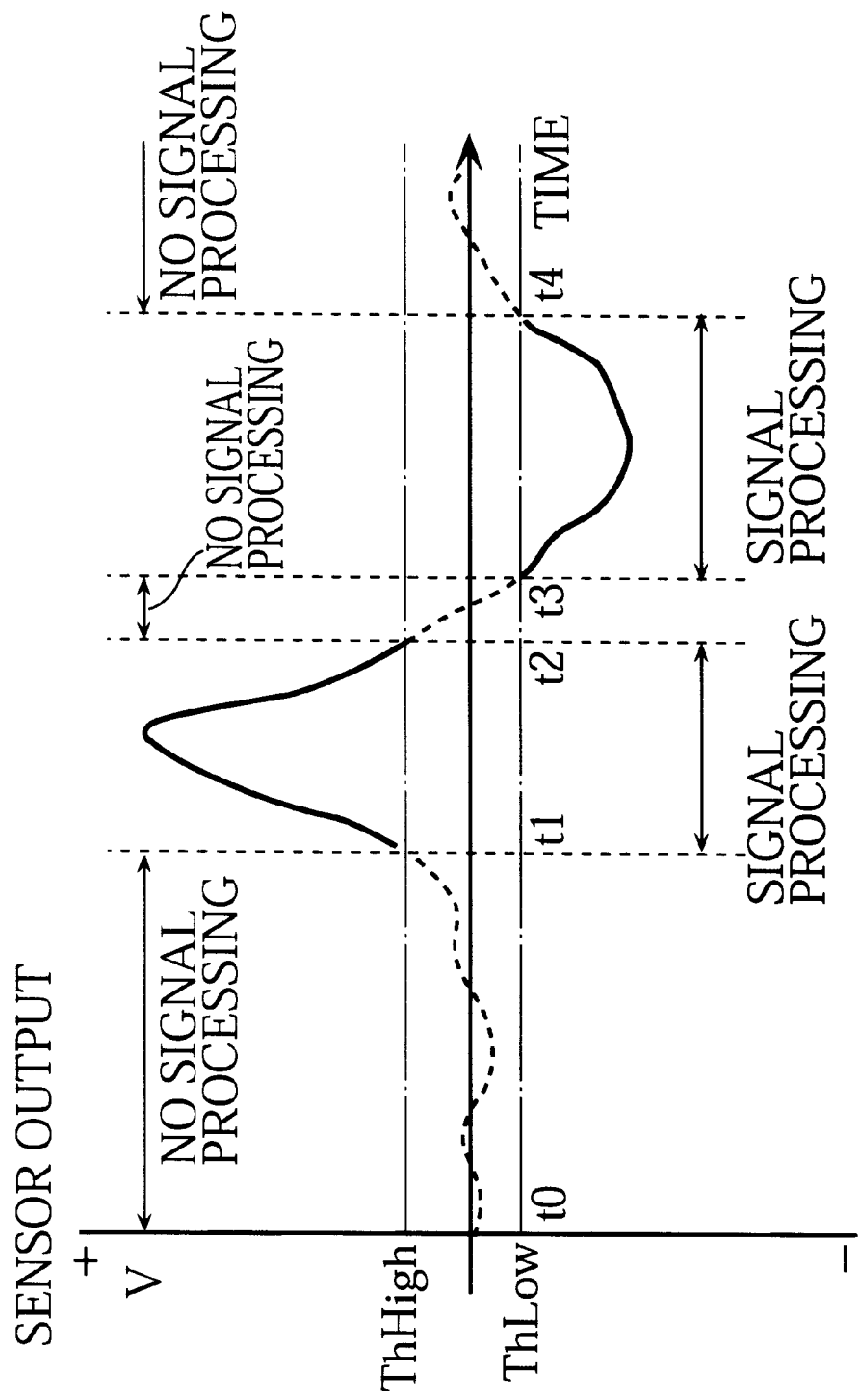

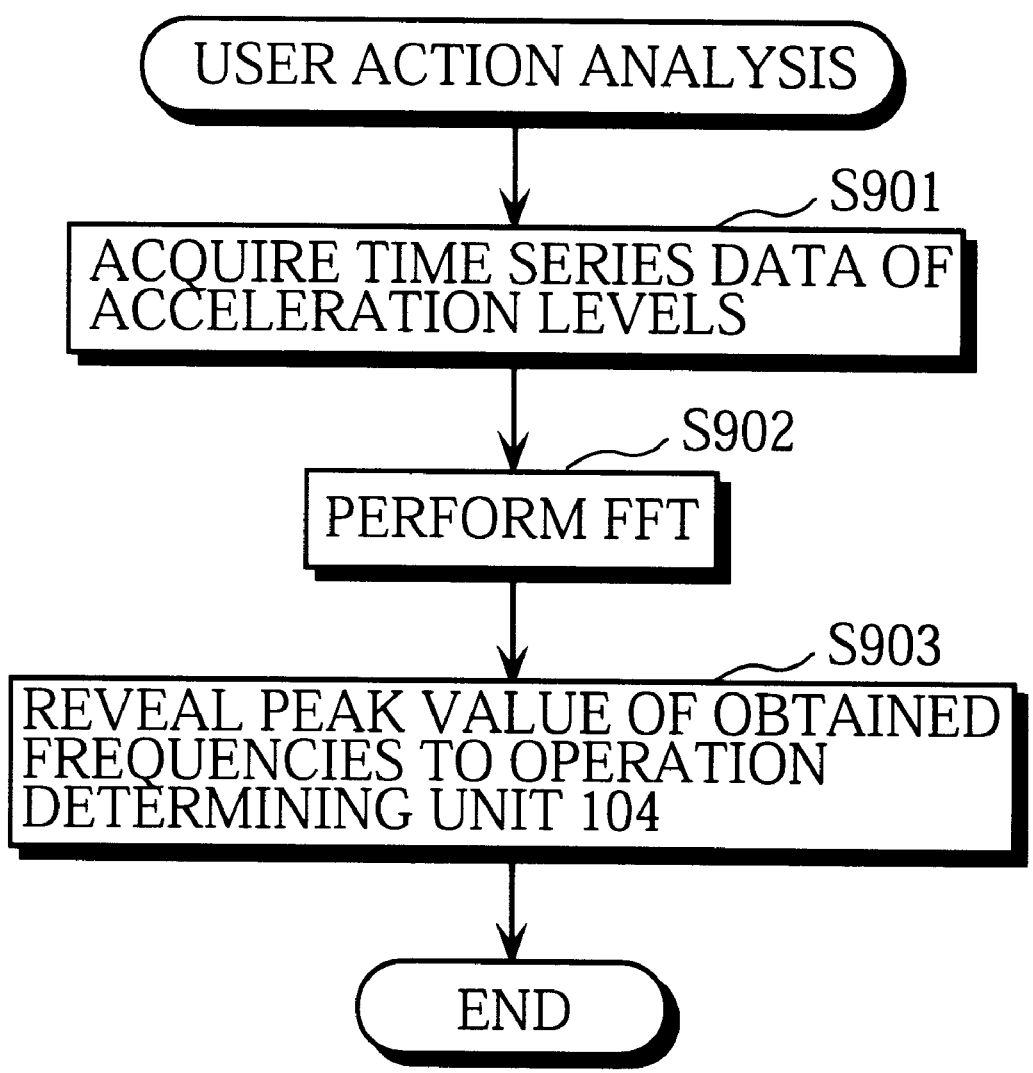

OPERATION INDICATION OUTPUTTING DEVICE FOR GIVING OPERATION INDICATION ACCORDING TO TYPE OF USER'S ACTION

This application is based on an application No. 10-254787 filed in Japan, the content of which is hereby incorporated by reference.

BACKGROUND OF THE INVENTION

1. Field of the Invention

The present invention relates to an operation indication outputting device for detecting a motion of the operation indication outputting device caused by a user's action and outputting an operation indication according to the detection result.

2. Description of the Prior Art

In virtual reality and other technologies, display control and operation indication are performed by digitally coding a movement of a person with position sensors (e.g. 3SPACE system made by Polhemus, Inc.) which use data gloves or magnetic transducing techniques and inputting generated codes into a computer. With the recent development of smaller and more accurate motion detection sensors such as acceleration sensors, several techniques are disclosed whereby such sensors are incorporated into a portable information processing apparatus to detect a motion of the body of the apparatus so that information processing is performed according to the detected motion.

For instance, Japanese Laid-Open Patent Application 6-4208 discloses a device that is equipped with a sensor for detecting a motion of the device and a motion analyzing unit for determining a direction, travel, and number of occurrence of movement or rotation of the device based on data outputted from the sensor, thereby designating the contents of processing according to the determined direction, travel, and number of occurrence of the motion. When this device is vertically and/or horizontally moved, the inside sensor detects the motion and outputs data of the motion, based on which the motion analyzing unit calculates the vertical travel and horizontal travel of the device. As a result, a display such as text on a liquid crystal display panel is scrolled sideways or up and down by a number of pixels corresponding to the calculated travel, or a cursor displayed on the display panel is moved sideways or up and down by the number of pixels.

However, this conventional device does not distinguish certain types of actions such as "swing" and "tap" made by a user against the body of the device, so that a selection of operations which can be designated is limited. Besides, when the user accidentally bumps the device against something while moving the device, an operation which the user does not intend may be designated by mistake.

SUMMARY OF THE INVENTION

In view of the above problems, the present invention aims to provide an operation indication outputting device that can give a wide variety of operation indications while preventing malfunctions, and a computer-readable storing medium that stores a program for realizing the function of the operation indication outputting device.

The stated object can be fulfilled by an operation indication outputting device for outputting an operation indication to an information processing apparatus to have the information processing apparatus perform processing based on the outputted operation indication, the operation indication outputting device including: a storing unit for storing operation indications that each correspond to a combination of a type of a user's action and at least one of a direction, a strength, and a number of occurrence of a motion of the operation indication outputting device caused by the user's action; a motion detecting unit for detecting a motion of the operation indication outputting device caused by the user's action; a motion analyzing unit for analyzing at least one of a direction, a strength, and a number of occurrence of the detected motion; a user action analyzing unit for analyzing a type of the user's action that causes the detected motion; and an outputting unit for reading, from the storing unit, an operation indication corresponding to a combination of an analysis result by the motion analyzing unit and an analysis result by the user action analyzing unit, and outputting the read operation indication to the information processing apparatus.

With this construction, the operation indication outputting device can have the information processing apparatus perform various processing by identifying the type of the action made by the user against the operation indication outputting device.

Here, the motion detecting unit may detect acceleration levels of the motion of the operation indication outputting device over time, wherein the motion analyzing unit analyzes at least one of the direction, the strength, and the number of occurrence of the motion by integrating, with respect to time, the acceleration levels outputted from the motion detecting unit.

With this construction, the motion of the operation indication outputting device can be detected with low-priced acceleration sensors, and at least one of the direction, strength, and number of occurrence of the motion can be analyzed by a simple procedure.

Here, the user action analyzing unit may include a fast Fourier transform analyzing unit for obtaining a frequency distribution by performing a fast Fourier transform on a curve produced by graphing the acceleration levels outputted from the motion detecting unit against time, to analyze the type of the user's action.

With this construction, the type of the user's action can be identified with respect to frequency by analyzing the frequency distribution.

Here, the user action analyzing unit may further include an output prohibiting unit for prohibiting the outputting unit to output the operation indication if a peak value in the obtained frequency distribution is any of below a first frequency and above a second frequency.

With this construction, it is possible to prevent the information processing apparatus from performing wrong processing in the event of an accident such as the user dropping the operation indication outputting device.

Here, the user action analyzing unit may include a differential analyzing unit for differentiating, according to a predetermined equation, a curve produced by graphing the acceleration levels outputted from the motion detecting unit against time, to analyze the type of the user's action.

With this construction, the type of the user's action can be judged by a simple procedure.

Here, the user action analyzing unit may further include an output prohibiting unit for prohibiting the outputting unit to output the operation indication if a mean value of differential values calculated by the differential analyzing unit is any of below a first threshold value and above a second threshold value.

With this construction, it is possible to prevent the information processing apparatus from performing wrong processing in the event of an accident such as the user dropping the operation indication outputting device.

Here, the user action analyzing unit may include a wavelet transform analyzing unit for detecting specific frequency components by performing a wavelet transform on a curve produced by graphing the acceleration levels outputted from the motion detecting unit against time, to analyze the type of the user's action.

With this construction, the type of the user's action can be accurately specified by analyzing frequency composition.

Here, the storing unit may further store operation indications that each correspond to an order of a plurality of types of the user's actions, wherein the user action analyzing unit further includes an action sequence analyzing unit for analyzing types of the user's actions that cause the motion, according to an order in which the detected specific frequency components appear, and wherein the outputting unit includes an order-corresponding operation indicating unit for reading, from the storing unit, an operation indication corresponding to an order of the types of the user's actions analyzed by the action sequence analyzing unit, and outputting the read operation indication to the information processing apparatus.

With this construction, a choice of operation indications which can be outputted to the information processing apparatus is further diversified.

Here, the user action analyzing unit may include a time analyzing unit for measuring, for each of a plurality of reference values, time during which the reference value is exceeded by absolute values of a sequence of acceleration levels among the acceleration levels outputted from the motion detecting unit, to analyze the type of the user's action.

With this construction, the type of the user's action can be specified with reference to the plurality of reference values.

Here, the user action analyzing unit may further include an output prohibiting unit for prohibiting the outputting unit to output the operation indication if at least one of absolute values of the outputted acceleration levels is any of below a first threshold value and above a second threshold value.

With this construction, it is possible to prevent the information processing apparatus from performing wrong processing in the event of an accident such as the user dropping the operation indication outputting device.

Here, the motion detecting unit may detect acceleration levels of the motion of the operation indication outputting device over time, wherein for each of a plurality of reference values, when the reference value is exceeded by absolute values of a sequence of acceleration levels among the acceleration levels outputted from the motion detecting unit, the motion analyzing unit analyzes a sign of an acceleration level whose absolute value first exceeds the reference value in the sequence of acceleration levels, and measures time during which the reference value is exceeded by the absolute values of the sequence of acceleration levels, thereby analyzing at least one of the direction, the strength, and the number of occurrence of the motion, and wherein the user action analyzing unit analyzes the type of the user's action based on the time measured by the motion analyzing unit.

With this construction, the type of the user's action can be identified by simply measuring a period for each of the plurality of reference values during which absolute values of detected acceleration levels exceed the reference value. In doing so, the operation indication outputting device can have the information processing apparatus execute various processing.

Here, the plurality of reference values may be made up of a first reference value and a second reference value larger than the first reference value, wherein the user action analyzing unit includes an output prohibiting unit for prohibiting the outputting unit to output the operation indication, any of if time during which the first reference value is exceeded is shorter than predetermined first time and if time during which the second reference value is exceeded is longer than predetermined second time.

With this construction, it is possible to prevent the information processing apparatus from performing wrong processing in the event of an accident such as the user dropping the operation indication outputting device.

Here, the first reference value may be set at a value corresponding to an acceleration level which is to be detected when the user swings the operation indication outputting device, wherein the second reference value is set at a value corresponding to an acceleration level which is to be detected when the user taps the operation indication outputting device, and wherein the user action analyzing unit analyzes whether the type of the user's action is "swing" or "tap".

With this construction, the type of the user's action can be specified as "swing" or "tap" by setting the first and second reference values respectively at values corresponding to, for example, 1 G and 2.5 G (G denotes the acceleration of gravity).

Here, the motion detecting unit may detect angular acceleration levels of the motion of the operation indication outputting device over time, wherein the motion analyzing unit analyzes at least one of the direction, the strength, and the number of occurrence of the motion by integrating, with respect to time, the angular acceleration levels outputted from the motion detecting unit.

With this construction, the operation indication outputting device can also analyze a rotary motion originated from the user's wrist when the user rotates the operation indication outputting device by hand, thereby further diversifying a choice of operation indications which can be outputted to the information processing apparatus.

Here, the user action analyzing unit may include a fast Fourier transform analyzing unit for obtaining a frequency distribution by performing a fast Fourier transform on a curve produced by graphing the angular acceleration levels outputted from the motion detecting unit against time, to analyze the type of the user's action.

With this construction, the type of the user's action can be identified on the basis of an analysis of the frequency distribution.

Here, the motion detecting unit may detect angular acceleration levels of the motion of the operation indication outputting device over time, wherein for each of a plurality of reference values, when the reference value is exceeded by absolute values of a sequence of angular acceleration levels among the angular acceleration levels outputted from the motion detecting unit, the motion analyzing unit analyzes a sign of an angular acceleration level whose absolute value first exceeds the reference value in the sequence of angular acceleration levels, and measures time during which the reference value is exceeded by the absolute values of the sequence of angular acceleration levels, thereby analyzing at least one of the direction, the strength, and the number of occurrence of the motion, and wherein the user action analyzing unit analyzes the type of the user's action based on the time measured by the motion analyzing unit.

With this construction, the type of the user's action can be identified by simply measuring a period for each of the plurality of reference values during which absolute values of detected angular acceleration levels exceed the reference value. As a result, the operation indication outputting device can have the information processing apparatus perform various processing.

The stated object can also be fulfilled by an operation indication outputting device which is incorporated into a mobile phone that is an information processing apparatus, wherein a processing mode of the mobile phone is changed according to an operation indication outputted from an outputting unit of the operation indication outputting device.

With this construction, the operability of the mobile phone which incorporates the operation indication outputting device is improved.

The stated object can also be fulfilled by a mobile phone that incorporates an operation indication outputting device for outputting an operation indication to the mobile phone to have the mobile phone perform processing based on the outputted operation indication, the operation indication outputting device including: a storing unit for storing operation indications that each correspond to a combination of a type of a user's action and at least one of a direction, a strength, and a number of occurrence of a motion of the operation indication outputting device caused by the user's action; a motion detecting unit for detecting a motion of the operation indication outputting device caused by the user's action; a motion analyzing unit for analyzing at least one of a direction, a strength, and a number of occurrence of the detected motion; a user action analyzing unit for analyzing a type of the user's action that causes the detected motion; and an outputting unit for reading, from the storing unit, an operation indication corresponding to a combination of an analysis result by the motion analyzing unit and an analysis result by the user action analyzing unit, and outputting the read operation indication to the mobile phone, wherein a processing mode of the mobile phone is changed according to the operation indication outputted from the outputting unit.

With this construction, the operability of the mobile phone which incorporates the operation indication outputting device is improved.

The stated object can also be fulfilled by a computer-readable storing medium storing a program executed by an operation indication outputting device that is equipped with a detecting unit for detecting a motion of the operation indication outputting device caused by a user's action and outputs an operation indication to an information processing apparatus to have the information processing apparatus perform processing based on the outputted operation indication, the program including: a motion analyzing step for analyzing at least one of a direction, a strength, and a number of occurrence of the motion detected by the detecting unit; a user action analyzing step for analyzing a type of the user's action that causes the detected motion; and an outputting step for reading, from an storing unit which stores operation indications that each correspond to a combination of a type of the user's action and at least one of a direction, a strength, and a number of occurrence of a motion of the operation indication outputting device caused by the user's action, an operation indication corresponding to a combination of an analysis result obtained in the motion analyzing step and an analysis result obtained in the user action analyzing step, and outputting the read operation indication to the information processing apparatus.

With this construction, the operation indication outputting device equipped with the motion detecting unit can be rendered a device that can output a wide variety of operation indications.

BRIEF DESCRIPTION OF THE DRAWINGS

These and other objects, advantages and features of the invention will become apparent from the following description thereof taken in conjunction with the accompanying drawings that illustrate a specific embodiment of the invention. In the drawings:

FIG. 8 shows threshold values used for acceleration levels outputted by the motion detecting unit 101;

FIG. 9 is a flowchart showing user action analysis by a user action analyzing unit 103 of the operation indication outputting device;

DESCRIPTION OF THE PREFERRED EMBODIMENT(S)

The following is a description of the embodiments of the present invention with reference to the figures.

First Embodiment

Figure 1:
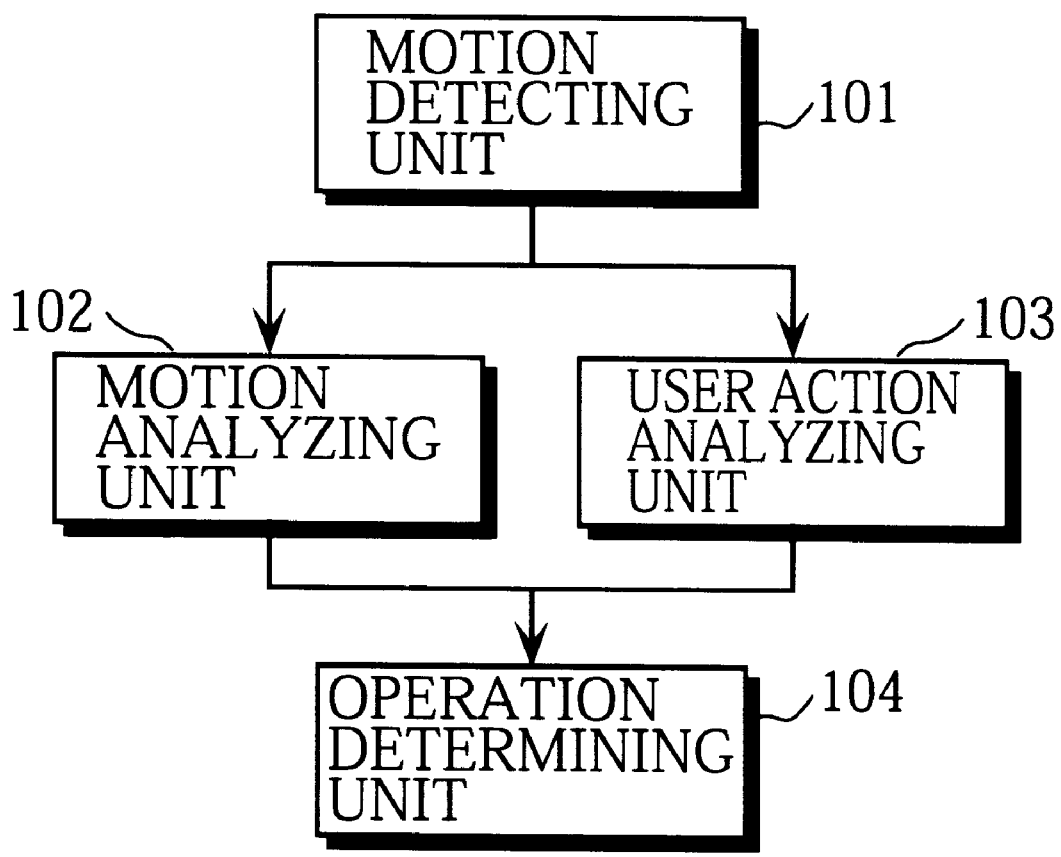
FIG. 1 shows the configuration of an operation indication outputting device of the first embodiment of the present invention.

FIG. 1 shows the configuration of an operation indication outputting device of the first embodiment of the present invention. The device includes a motion detecting unit 101, a motion analyzing unit 102, a user action analyzing unit 103, and an operation determining unit 104.

Figure 2:
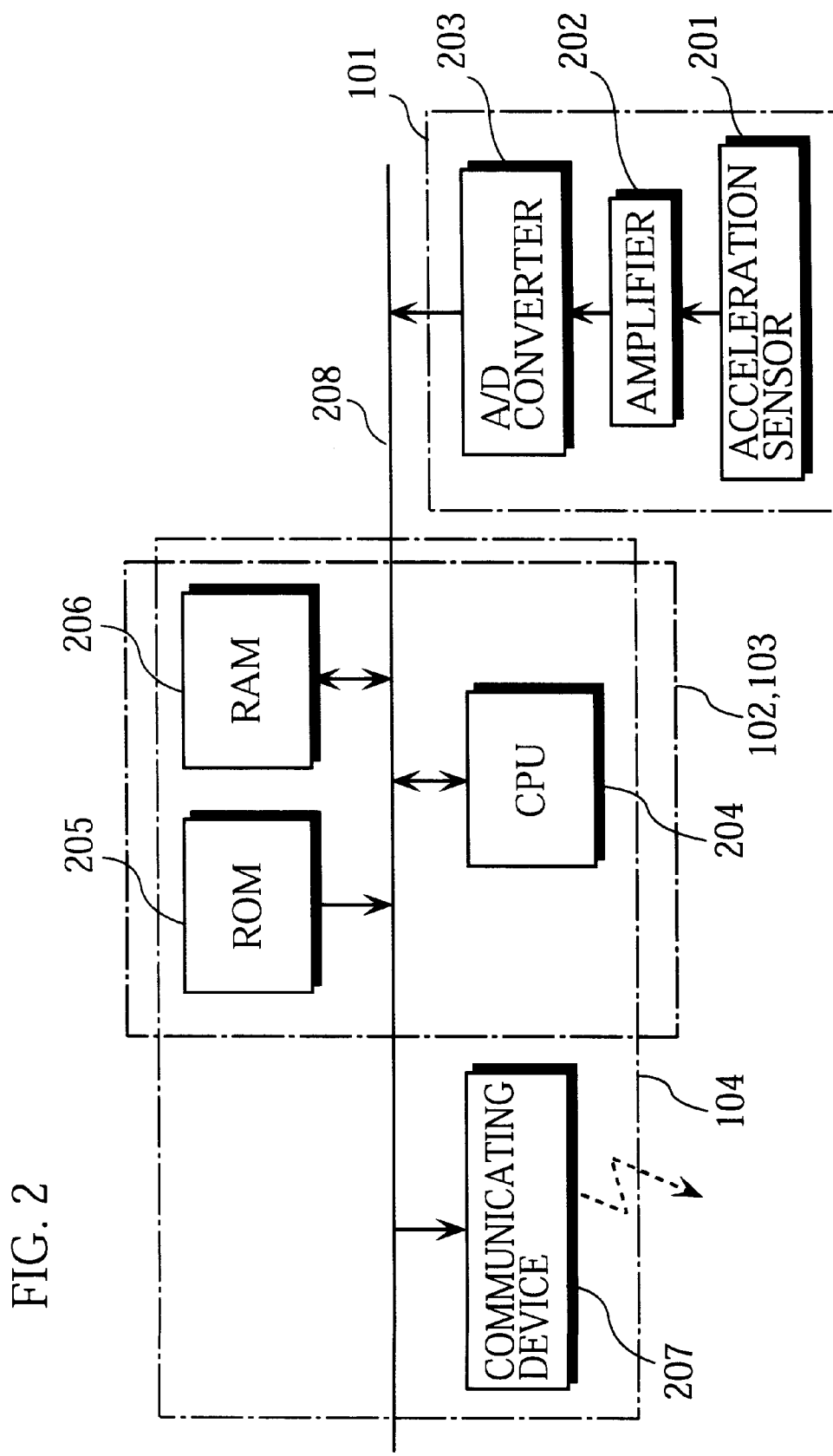
FIG. 2 shows the hardware construction of the operation indication outputting device.

FIG. 2 shows the hardware construction of this operation indication outputting device. The motion detecting unit 101 is implemented by an acceleration sensor 201, a signal amplifier 202, and an A/D (analog-to-digital) converter 203. The motion analyzing unit 102 and the user action analyzing unit 103 are implemented by a CPU 204, a ROM 205, and a RAM 206. The operation determining unit 104 is implemented by the CPU 204, the ROM 205, the RAM 206, and a communicating device 207. The A/D converter 203, the CPU 204, the ROM 205, the RAM 206, and the communicating device 207 are connected to a bus 208.

The motion detecting unit 101 samples acceleration levels in the acceleration sensor 201 at predetermined time intervals of, for instance, 1/100 second, amplifies analog voltage changes in the amplifier 202, converts the amplification result to digital data in the A/D converter 203, and outputs the digital data to the motion analyzing unit 102 and user action analyzing unit 103 via the bus 208.

Figure 3:
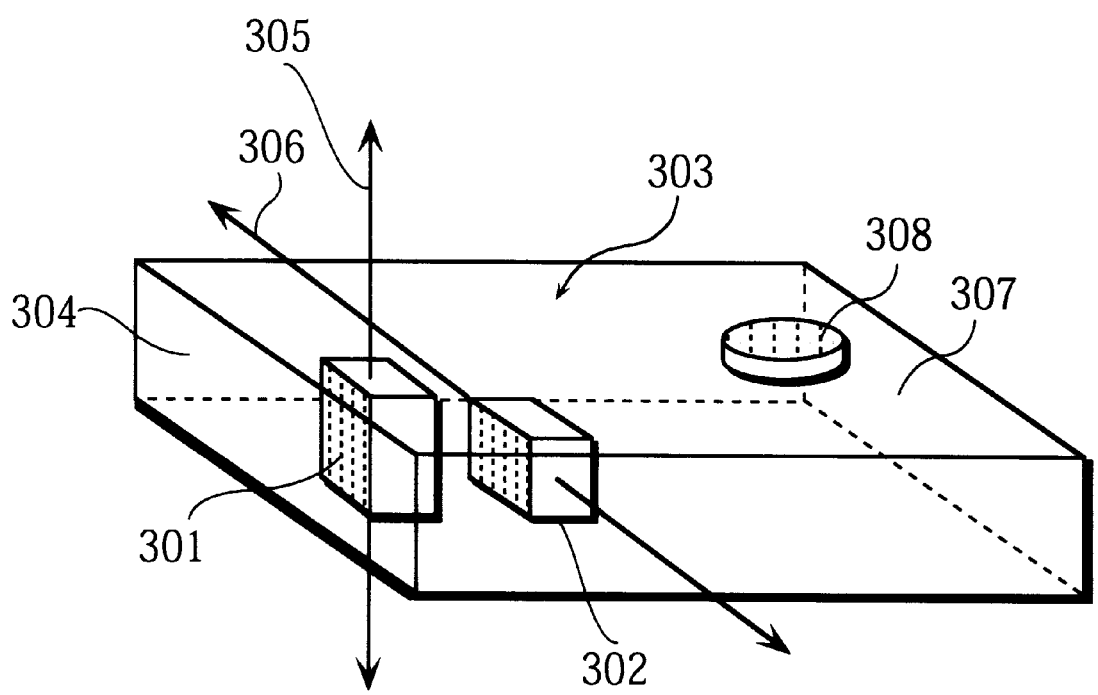
FIG. 3 shows the appearance of the operation indication outputting device and the placement of a motion detecting unit 101.

FIG. 3 shows the appearance of the operation indication outputting device and the placement of the acceleration sensor 201 of the motion detecting unit 101.

In the figure, the motion detecting unit 101 has two acceleration sensors 301 and 302 which are equipped inside an enclosure 303. The acceleration sensors 301 and 302 are placed respectively on detection axes 305 and 306 that are orthogonal to each other, to detect motion on a two-dimensional plane parallel to the front 304 of the enclosure 303.

Here, to detect motion of the enclosure 303 in a single direction the motion detecting unit 101 may include only an acceleration sensor, while to detect motion of the enclosure 303 in a three-dimensional space another acceleration sensor may be placed on a detection axis orthogonal to the detection axes 305 and 306, in addition to the acceleration sensors 301 and 302.

Also, an action start button 308 may be placed on the surface 307 of the enclosure 303 to detect motion of the enclosure 303 while the user is pressing the button 308.

Further, a contact sensor for sensing contact by the user may be equipped in the enclosure 303 to detect motion of the enclosure 303 while the user is holding the enclosure 303.

Instead of being equipped with the above button and acceleration sensors, the operation indication outputting device may analyze motion of the enclosure 303 only when an output level of the acceleration sensor 201 exceeds a predetermined threshold value (ThHigh/ThLow).

Figure 4A:
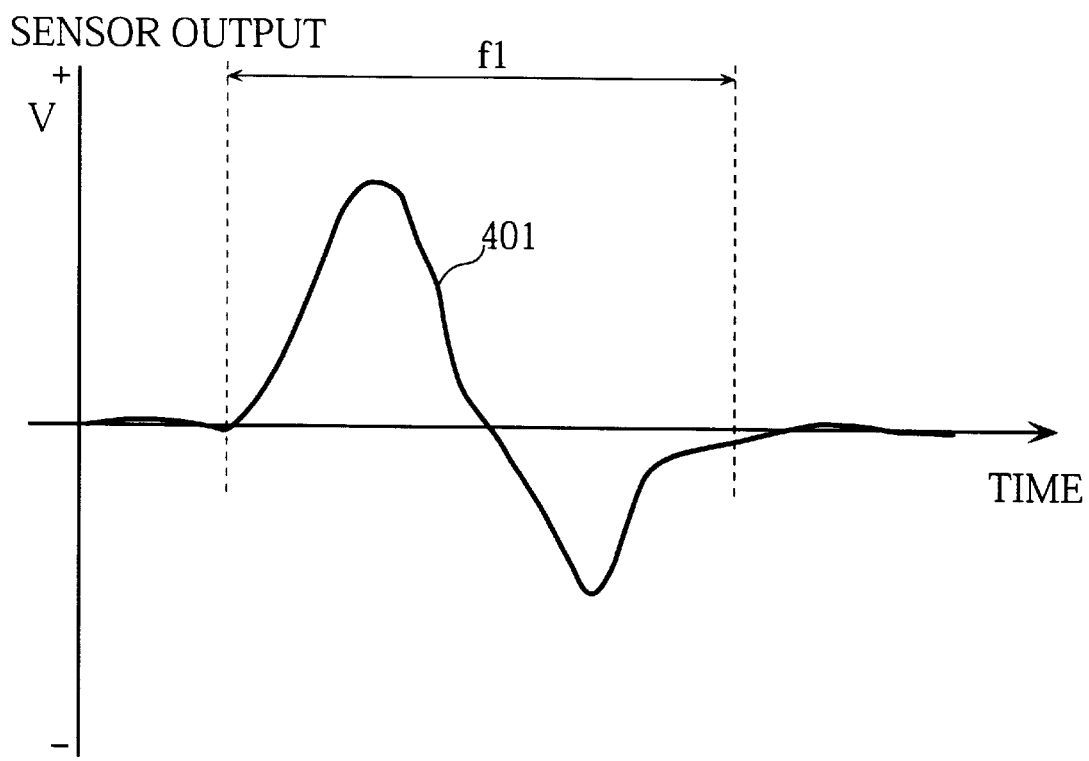
FIG. 4A shows an acceleration curve outputted from an acceleration sensor of the motion detecting unit 101 when the user swings the operation indication outputting device once.
Figure 4B:
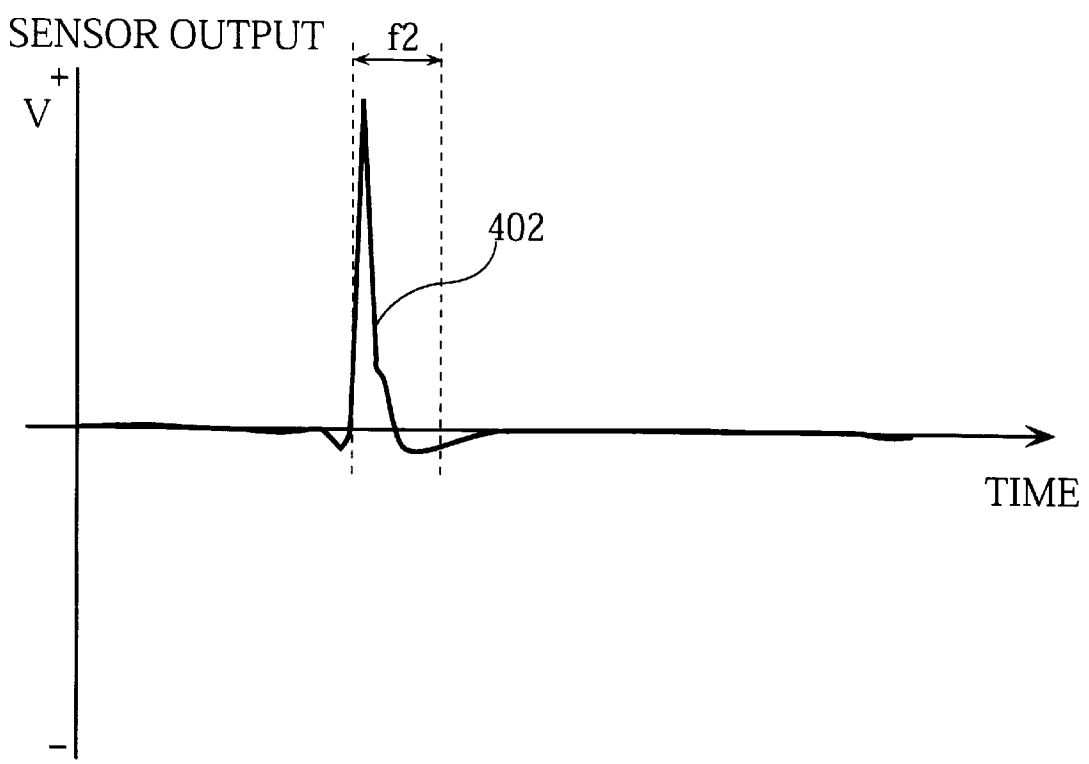
FIG. 4B shows an acceleration curve outputted from an acceleration sensor of the motion detecting unit 101 when the user taps the operation indication outputting device once.

FIGS. 4A and 4B show data outputted from the motion detecting unit 101. Curve 401 shown in FIG. 4A is an acceleration curve outputted, for example, from the acceleration sensor 302 when the enclosure 303 is swung once in the positive direction of the detection axis 306 and then stopped. The inverse of time taken for this motion, represented by frequency f1, is around 1~5 Hz.

Curve 402 shown in FIG. 4B is an acceleration curve outputted, for example, from the acceleration sensor 301 when the enclosure 303 is tapped once in the positive direction of the detection axis 305. Frequency f2 in this case is around 100~150 Hz.

Note here that to swing the enclosure 303 once is to move the enclosure 303 from one point to another, while to tap the enclosure 303 once is to strike the enclosure 303 with a single light blow.

Thus, a frequency differs depending on a type of an action, such as "swing" or "tap", made by the user against the enclosure 303. The present invention reflects such differences of types of the user's actions on the contents of an operation indication to be outputted.

The motion analyzing unit 102 checks sign, magnitude, and inflection point in acceleration data outputted from the motion detecting unit 101 to analyze a direction, strength, and number of occurrence of a motion, and passes the analysis result to the operation determining unit 104.

As is evident from the hardware construction in FIG. 2, the motion analyzing unit 102 performs the analysis via the CPU 204 according to a program stored in the ROM 205.

The analysis procedure by the motion analyzing unit 102 is explained below with reference to FIGS. 5 and 6.

Figure 5:
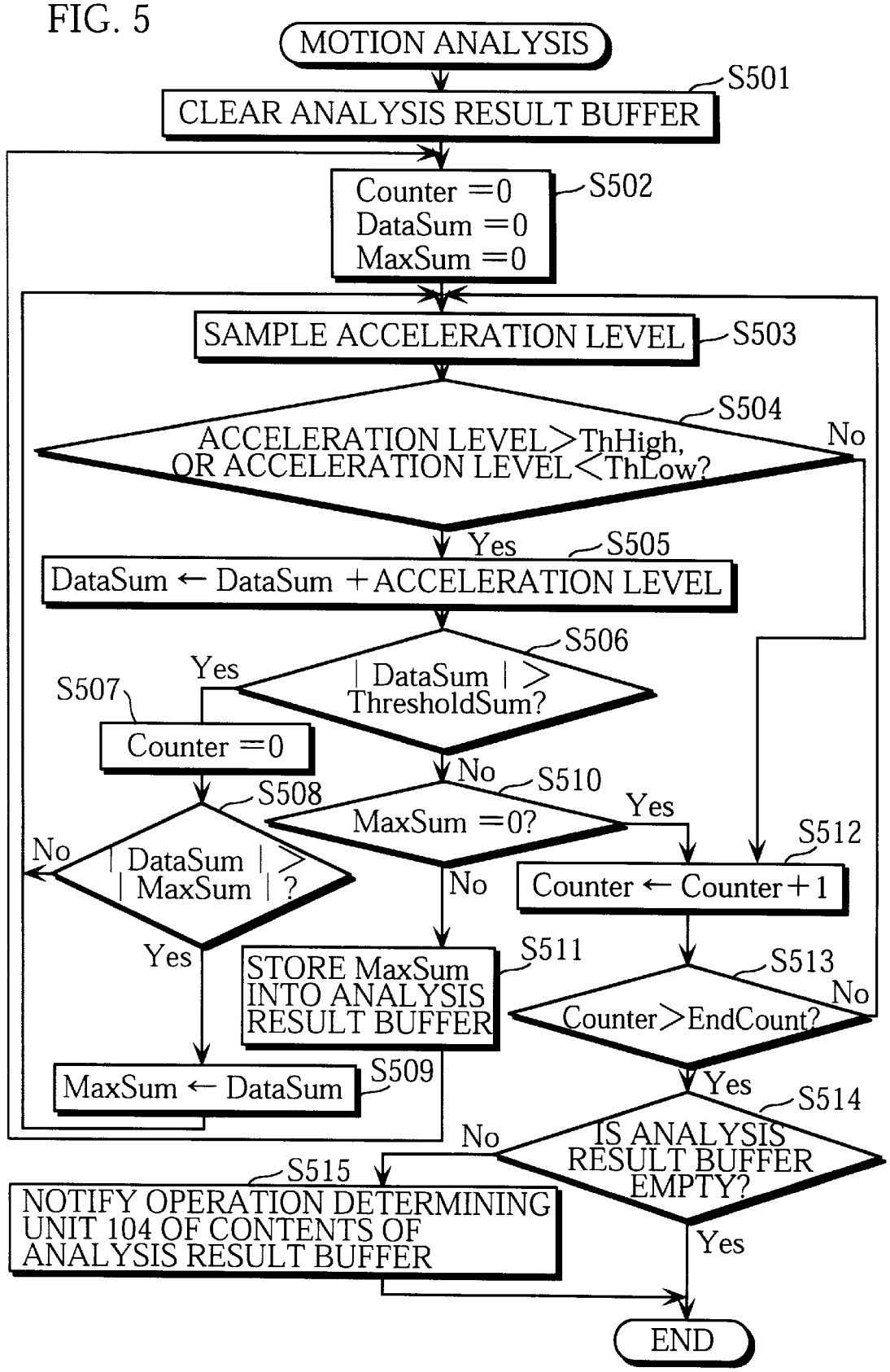
FIG. 5 is a flowchart showing an example of motion analysis by a motion analyzing unit 102 of the operation indication outputting device.

The analysis procedure in FIG. 5 is as follows. Here, the RAM 206 is used as a buffer for storing an analysis result.

Figure 7A:
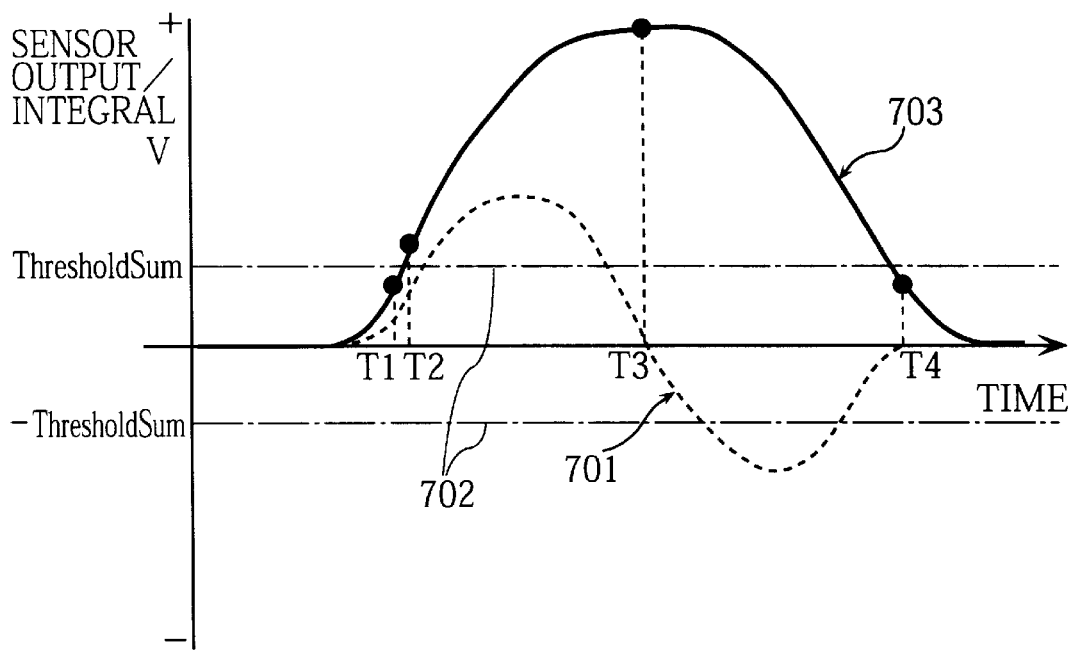
FIG. 7A shows an integral curve for acceleration levels obtained by the motion analyzing unit 102 when the user swings the operation indication outputting device once.

In this example, acceleration levels sequentially outputted from the motion detecting unit 101 are represented by dashed line 701 in FIG. 7A.

The motion analyzing unit 102 commences its motion analysis once the user has pressed the button 308 or the output from the acceleration sensor 301/302 has changed.

The motion analyzing unit 102 first clears the analysis result buffer 206 (S501) and initializes variables DataSum, MaxSum, and Counter to 0 (S502).

The motion analyzing unit 102 then acquires an acceleration level outputted from the motion detecting unit 101 (S503) and judges whether the acceleration level is above predetermined threshold value ThHigh (on the plus side) and whether the acceleration level is below predetermined threshold value ThLow (on the minus side) (S504). If the acceleration level is neither greater than ThHigh nor smaller than ThLow, the procedure proceeds to step S512. Otherwise, the motion analyzing unit 102 adds the acceleration level to DataSum (S505). Here, DataSum is used for evaluating the integral of acceleration levels and so expresses velocity.

The motion analyzing unit 102 next judges whether the absolute value of DataSum exceeds threshold value ThresholdSum (S506). In FIG. 7A, ±ThresholdSum is represented by single point chained line 702, whereas DataSum is represented by velocity curve 703.

When the absolute value of DataSum exceeds ThresholdSum at time T2 in FIG. 7A, the motion analyzing unit 102 initializes Counter to 0 (S507) and judges whether the absolute value of DataSum exceeds the absolute value of MaxSum (S508). If the absolute value of DataSum does not exceed the absolute value of MaxSum, the procedure returns to step S503. Otherwise, the motion analyzing unit 102 assigns DataSum to MaxSum (S509) and returns to step S503. The process from step S503 to step S509 is repeated until time T3 in the present example.

If the absolute value of DataSum does not exceed ThresholdSum in step S506 as in the case of time T1 or time T4, the motion analyzing unit 102 judges whether MaxSum=0 (S510). If MaxSum≠0 as in the case of time T4, the motion analyzing unit 102 writes MaxSum into the analysis result buffer 206 (S511) and returns to step S502. If MaxSum=0, on the other hand, the motion analyzing unit 102 increments Counter by 1 (S512).

The motion analyzing unit 102 then judges whether Counter exceeds specified value EndCount (S513). When Counter≦EndCount, the procedure returns to step S503. When Counter>EndCount, the motion analyzing unit 102 judges whether the analysis result buffer 206 is empty (S514). If the analysis result buffer 206 is empty, the motion analysis procedure ends. Otherwise, the motion analyzing unit 102 notifies the operation determining unit 104 of the storage contents of the analysis result buffer 206 (S515) and ends the motion analysis procedure.

Here, EndCount is specified based on a sampling time interval in step S503 and adjusted so that the analysis procedure ends when a few seconds lapse before time T1 or after time T4. EndCount may also be altered by the user.

MaxSum notified to the operation determining unit 104 in this example is the integral at time T3 in FIG. 7A and denotes the maximum velocity when the enclosure 303 is swung.

The sign of MaxSum shows whether the enclosure 303 was swung in the positive direction or the negative direction, while the magnitude of MaxSum shows whether the enclosure 303 was swung lightly or strongly. Also, the fact that there is only one MaxSum in FIG. 7A denotes that the enclosure 303 was swung once.

Figure 7B:
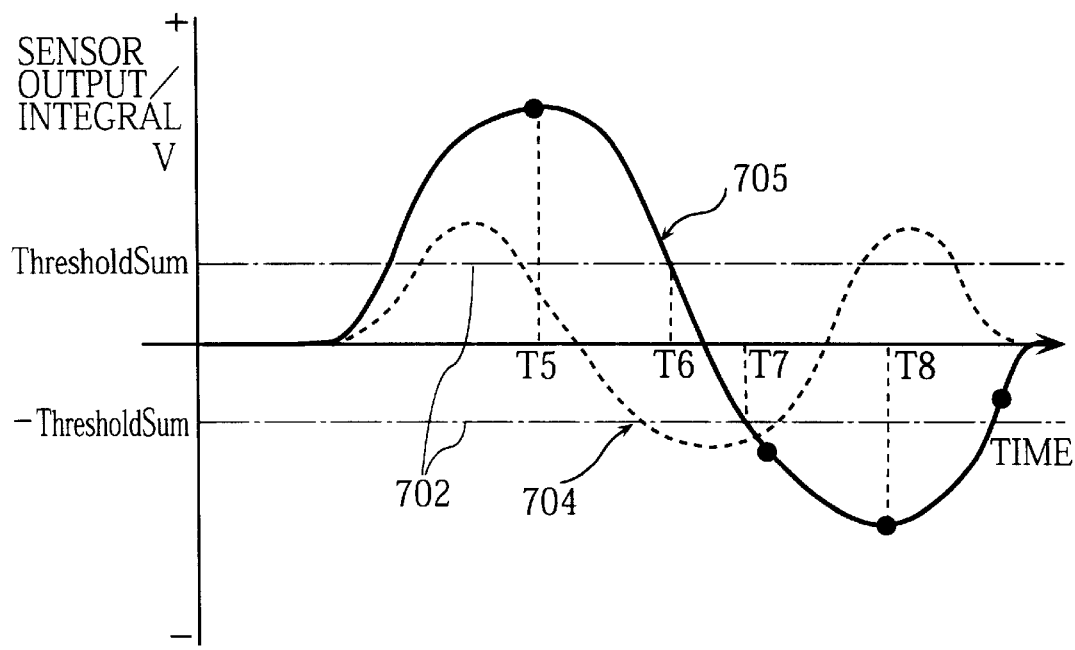
FIG. 7B shows an integral curve for acceleration levels obtained by the motion analyzing unit 102 when the user swings the operation indication outputting device continuously.

On the other hand, when a sequence of acceleration levels represented by dashed line 704 in FIG. 7B is outputted from the motion detecting unit 101, the motion analysis procedure is performed as follows.

In this case, after DataSum at time T5 is written into the analysis result buffer 206 as MaxSum in step S511, between time T6 and time T7 the absolute value of velocity curve 705 does not exceed ThresholdSum 702 and so Counter is incremented by 1 in step S512 for each acceleration level during this period. Since Counter does not exceed EndCount at time T7, the procedure continues and eventually DataSum at time T8 is written into the analysis result buffer 206 as MaxSum in step S511.

Thus, for the sequence of acceleration levels shown in FIG. 7B, the motion analyzing unit 102 notifies the operation determining unit 104 of both positive MaxSum and negative MaxSum.

When revealing the storage contents of the analysis result buffer 206 to the operation determining unit 104 in step S515, the motion analyzing unit 102 also notifies which of the acceleration sensors 301 and 302 the revealed analysis result is derived from.

While the motion analyzing unit 102 has received one acceleration level at a time from the motion detecting unit 101 in step S503, instead a sequence of acceleration levels may altogether be buffered in the RAM 206 to be later extracted one by one.

Also, as shown in FIG. 8, step S504 can be omitted if the motion detecting unit 101 is designed to output an acceleration level (with signal processing) when an output of the acceleration sensor 301/302 is either greater than ThHigh or smaller than ThLow.

In such a case, the motion detecting unit 101 outputs acceleration levels to the motion analyzing unit 102 and user action analyzing unit 103 during t1~t2 and t3~t4, and does not output acceleration levels during t0~t1 and t2~t3 and after t4.

Such a process by the motion detecting unit 101 or step S504 by the motion analyzing unit 102 is effective to avoid unwanted processing for error acceleration levels of small magnitudes detected by the acceleration sensor 301/302.

On the other hand, the analysis procedure in FIG. 6 that does not use the analysis result buffer 206 is as follows.

The motion analyzing unit 102 first initializes variables DataSum and MaxSum to 0 (S601) and judges whether the motion analyzing unit 102 is prompted to end the procedure (S602). If so, the motion analyzing unit 102 ends the motion analysis procedure. Here, the motion analyzing unit 102 ends the procedure when the user stops pressing the button 308 or after the operation determining unit 104 outputs an operation indication to an information processing apparatus.

If not yet prompted to end the procedure, the motion analyzing unit 102 samples an acceleration level outputted from the motion detecting unit 101 (S603) and adds the acceleration level to DataSum (S604).

The motion analyzing unit 102 then judges whether the absolute value of DataSum exceeds threshold value ThresholdSum (S605). If the absolute value of DataSum does not exceed ThresholdSum, the motion analyzing unit 102 judges whether MaxSum=0 (S606). If MaxSum=0, the procedure returns to step S602, while if MaxSum≠0, the procedure proceeds to step S609. When, on the other hand, the absolute value of DataSum exceeds ThresholdSum in step S605, the motion analyzing unit 102 further judges whether the absolute value of DataSum exceeds the absolute value of MaxSum (S607). If the absolute value of DataSum does not exceed the absolute value of MaxSum, the procedure returns to step S602. Otherwise, the motion analyzing unit 102 assigns DataSum to MaxSum (S608) and returns to step S602.

The motion analyzing unit 102 lastly notifies the operation determining unit 104 of MaxSum and returns to step S601.

Figure 6:
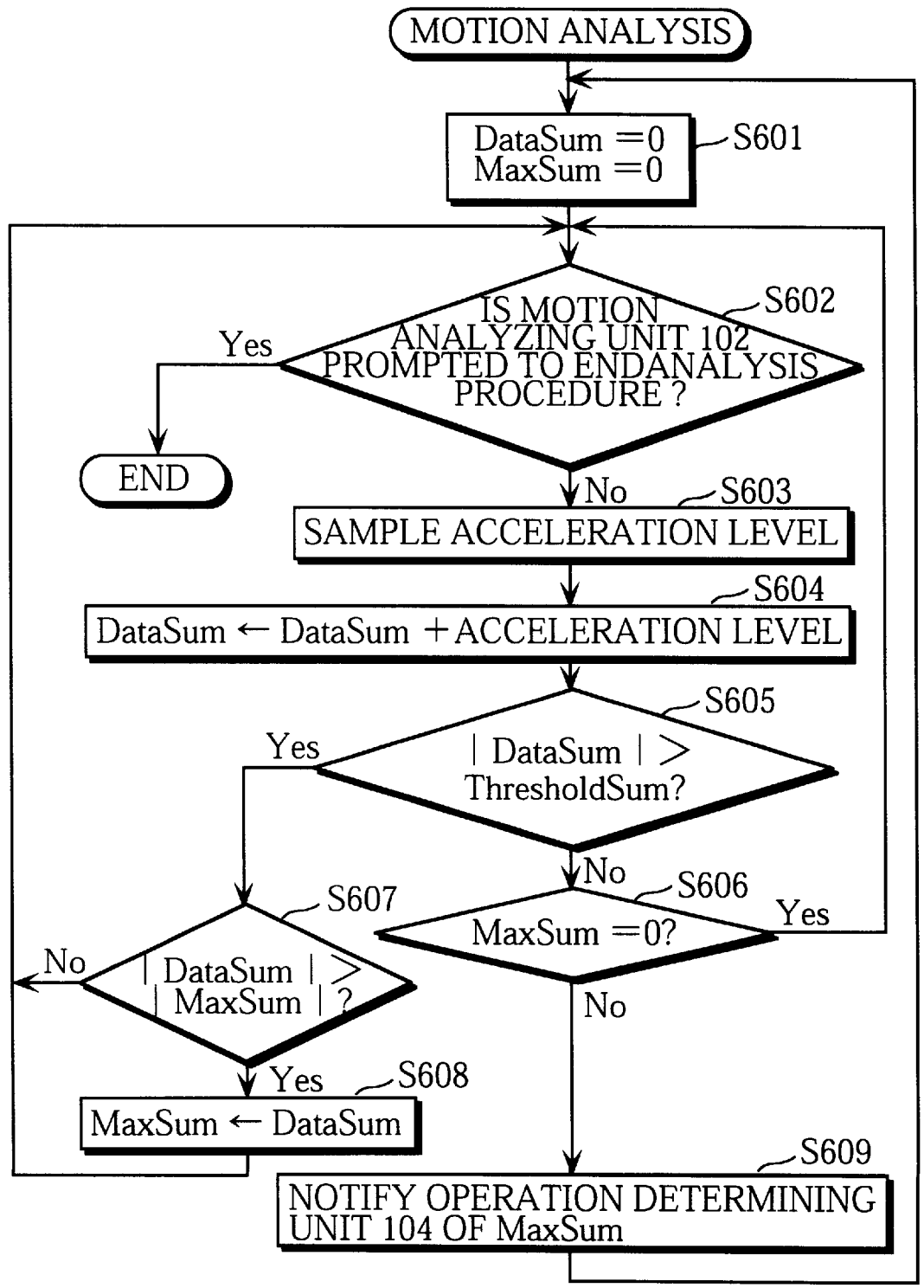
FIG. 6 is a flowchart showing another example of motion analysis by the motion analyzing unit 102.

The difference between the analysis procedure in FIG. 5 and the analysis procedure in FIG. 6 that uses the analysis result buffer 206 is merely that maximum and minimum values of MaxSum are either sequentially or concurrently revealed to the operation determining unit 104, so that they do not essentially differ.

Meanwhile, the user action analyzing unit 103 operates as follows.

On prompted to commence user action analysis by the motion analyzing unit 102, the user action analyzing unit 103 performs a fast Fourier transform (FFT) on acceleration levels outputted from the motion detecting unit 101 in time series and reveals a peak value of obtained frequencies to the operation determining unit 104.

Here, if the peak value is smaller than a predetermined frequency (FREQ_LOW) on the low frequency side or greater than a predetermined frequency (FREQ_HIGH) on the high frequency side, the user action analyzing unit 103 prohibits the operation determining unit 104 to output an operation indication.

The user action analysis by the user action analyzing unit 103 is executed via the CPU 204 according to the program stored in the ROM 205, in the same way as the motion analyzing unit 102.

FIG. 9 is a flowchart showing the user action analysis procedure by the user action analyzing unit 103.

The user action analyzing unit 103 acquires time series data of acceleration levels outputted from the motion detecting unit 101, when prompted by the motion analyzing unit 102 to start the user action analysis (S901).

The user action analyzing unit 103 then performs a FFT on the acquired acceleration curve to obtain a frequency distribution (S902).

Figure 10B:
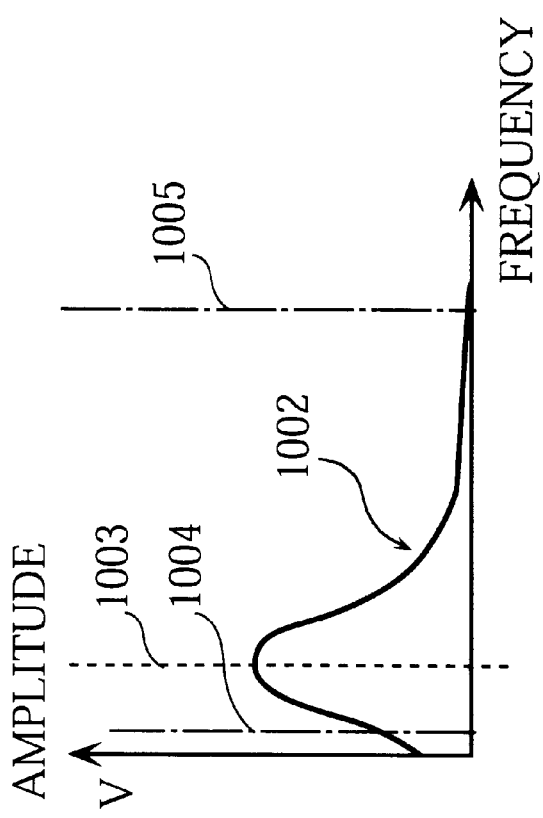
FIG. 10B shows a frequency distribution curve obtained by the user action analyzing unit 103 performing a FFT on the acceleration curve in FIG. 10A.
Figure 10A:
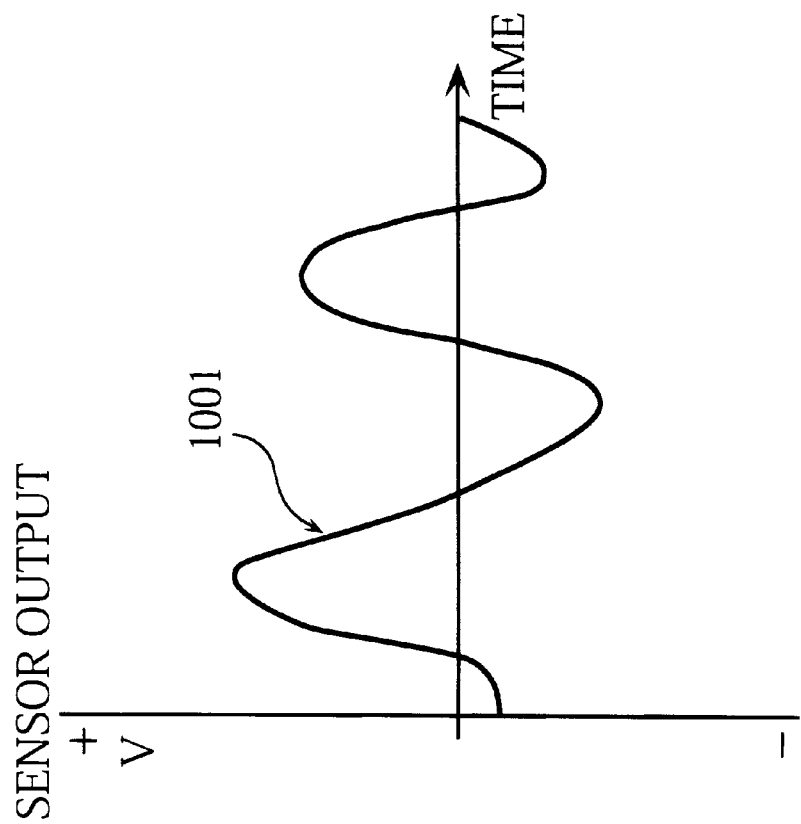
FIG. 10A shows an acceleration curve outputted from the motion detecting unit 101 when the user swings the operation indication outputting device.

FIG. 10A shows acceleration curve 1001 generated when the user continuously swings the enclosure 303, whereas FIG. 10B shows frequency distribution curve 1002 obtained by performing a FFT on acceleration curve 1001. Peak point 1003 of frequency distribution curve 1002 is of 1~5 Hz.

Figure 11B:
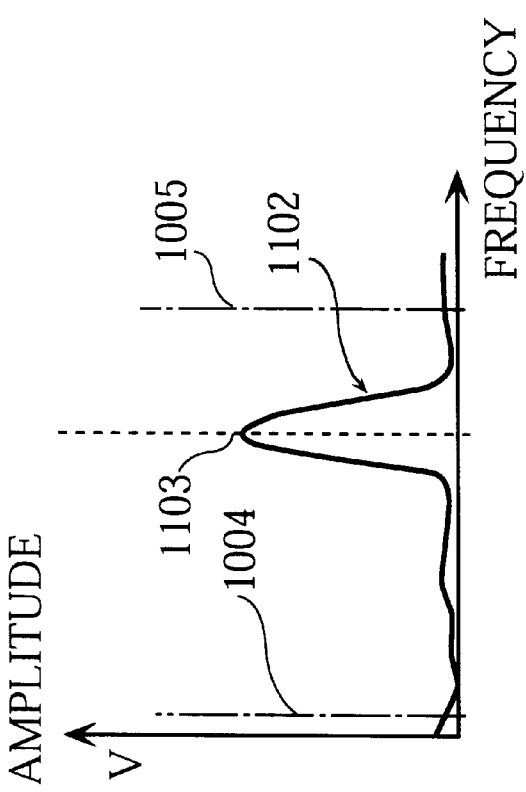
FIG. 11B shows a frequency distribution curve obtained by the user action analyzing unit 103 performing a FFT on the acceleration curve in FIG. 11A.
Figure 11A:
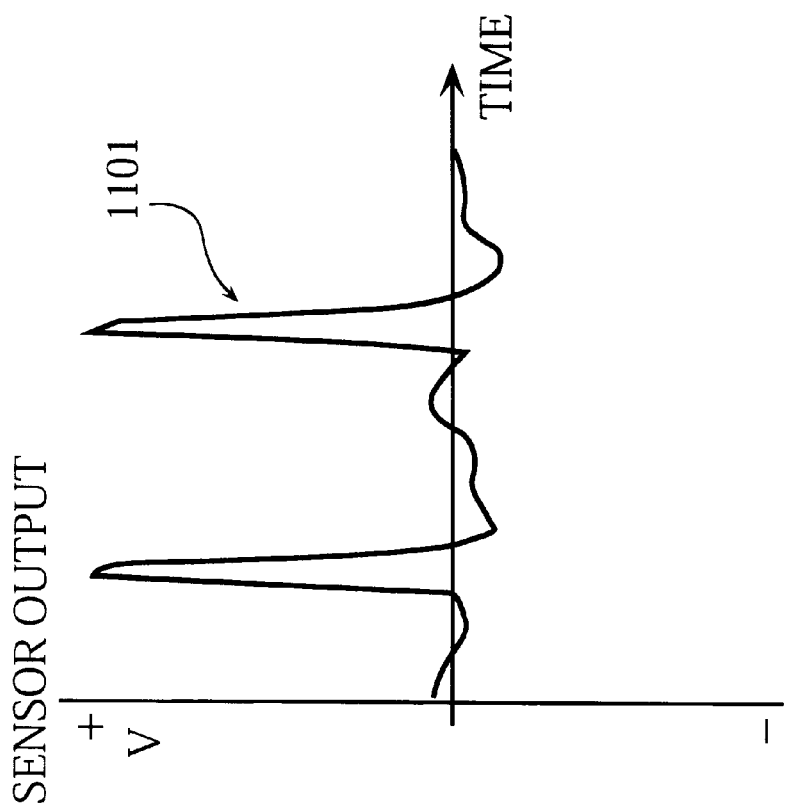
FIG. 11A shows an acceleration curve outputted from the motion detecting unit 101 when the user taps the operation indication outputting device.

FIG. 11A shows acceleration curve 1101 generated when the user taps the enclosure 303 twice, whereas FIG. 11B shows frequency distribution curve 1102 obtained by performing a FFT on acceleration curve 1101. Peak point 1103 of frequency distribution curve 1102 is of 100~150 Hz.

The user action analyzing unit 103 notifies the operation determining unit 104 of a frequency at the main peak point of the obtained frequency distribution curve and an acceleration sensor that detected the pertinent acceleration (S903) before completing the procedure.

It should be noted that in step S903 when the peak point of the obtained frequency distribution curve is below frequency FREQ_LOW on the low frequency side (shown by single point chained line 1004) or above frequency FREQ_HIGH on the high frequency side (shown by single point chained line 1005) in FIG. 10B or 11B, the user action analyzing unit 103 prohibits the operation determining unit 104 to output an operation indication, instead of revealing the peak frequency to the operation determining unit 104. FREQ_LOW 1004 is set at 1 Hz for example. Suppose the enclosure 303 placed on an inclined surface moves accidentally. In such a case, a frequency distribution whose peak point is below FREQ_LOW is detected. Meanwhile, FREQ_HIGH 1005 is set at 200 Hz for example. Suppose the enclosure 303 is dropped or bumped against something. In such a case, a frequency distribution whose peak point is above FREQ_HIGH is detected. With the use of FREQ_LOW and FREQ_HIGH, it is possible to prevent the operation determining unit 104 from outputting a wrong operation indication to the information processing apparatus in the event of accidental movements such as above.

The operation determining unit 104 holds an operation determination table which has been stored in the ROM 205 in advance. Based on MaxSum received from the motion analyzing unit 102 and a peak value of a frequency distribution received from the user action analyzing unit 103, the operation determining unit 104 reads an operation indication corresponding to the received MaxSum and peak value from the operation determination table and outputs the read operation indication to the information processing apparatus via the communicating device 207. The communicating device 207 outputs an infrared signal expressing the operation indication to a light receiving unit (not illustrated) of the information processing apparatus via an infrared transmission line, through an aperture on the front 304 of the enclosure 303.

Figure 12:
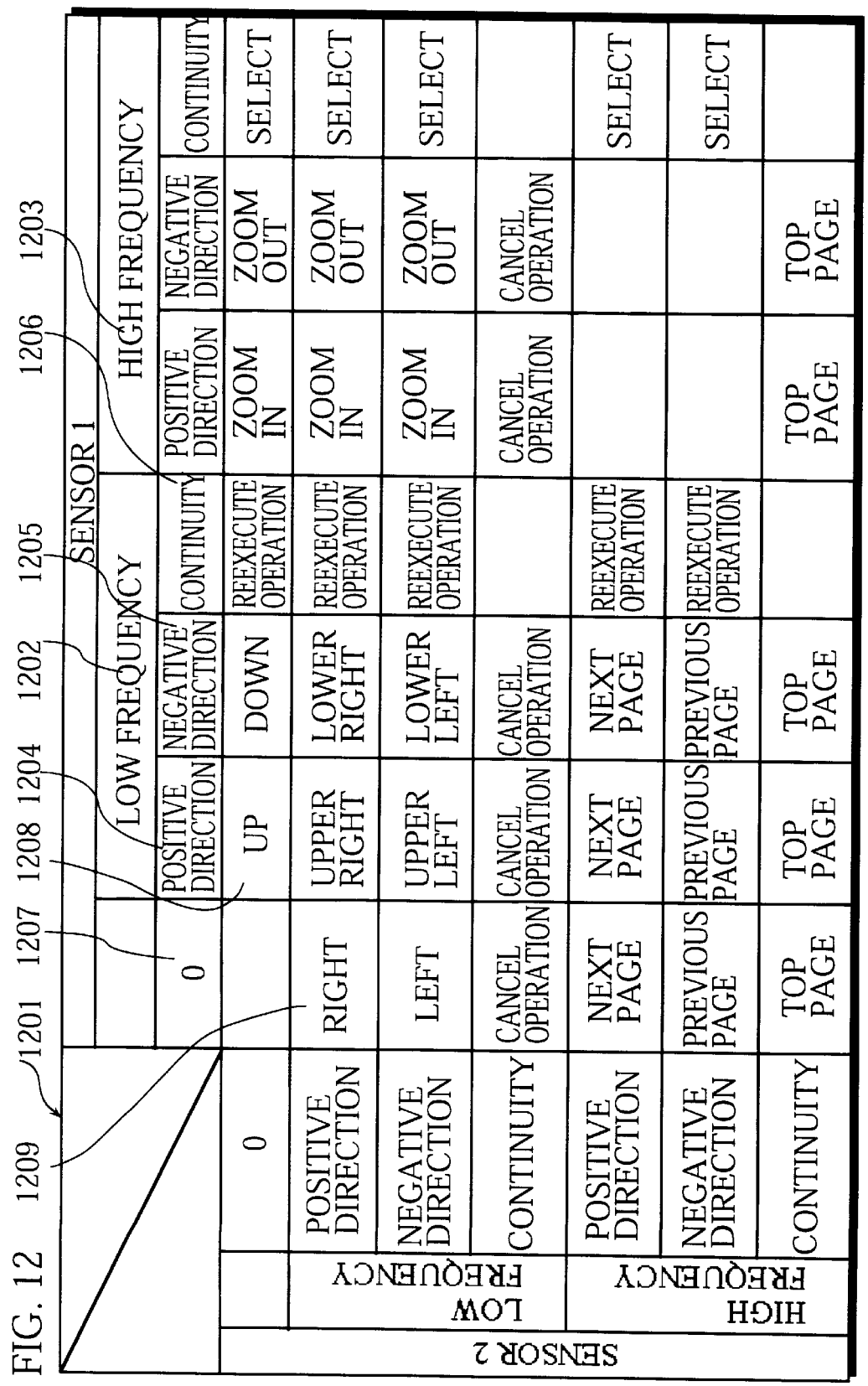
FIG. 12 shows the contents of an operation determination table stored in an operation determining unit 104 of the operation indication outputting device.

FIG. 12 shows the contents of the operation determination table 1201. Sensors 1 and 2 respectively correspond to the acceleration sensors 301 and 302.

When a peak frequency notified by the user action analyzing unit 103 for sensor 1 is no greater than an established value such as 50 Hz, the operation determining unit 104 looks at "low frequency" 1202, whereas the peak frequency is greater than the established value, the operation determining unit 104 looks at "high frequency" 1203.

Also, when MaxSum notified by the motion analyzing unit 102 is a positive value while a peak frequency notified by the user action analyzing unit 103 for sensor 1 is no greater than the established value, the operation determining unit 104 looks at "positive direction" 1204, whereas when MaxSum is a negative value, the operation determining unit 104 looks at "negative direction" 1205. If at least one positive MaxSum and at least one negative MaxSum are notified by the notion analyzing unit 102, "continuity" 1206 is referred to, whereas if there is no notification from the motion analyzing unit 102, "0" 1207 is referred to in determining an operation indication. The same applies to sensor 2.

Assume a peak value 6 Hz of frequencies detected by sensor 1 is notified from the user action analyzing unit 103 and a positive value of MaxSum is notified from the motion analyzing unit 102, while no notification is made for sensor 2. Then "up" 1208 corresponding to "positive direction" 1204 in "low frequency" 1202 of sensor 1 and "0" of sensor 2 is read as an operation indication and outputted to the information processing apparatus via the communicating device 207.

Assume, on the other hand, a peak frequency 2 Hz and a positive value of MaxSum are notified for sensor 2 while no notification is made for sensor 1. Then "right" 1209 corresponding to "0" 1207 of sensor 1 and "positive direction" in "low frequency" of sensor 2 is read as an operation indication and outputted to the information processing apparatus.

Thus, with the user's action of swinging the enclosure 303 that contains the operation indication outputting device, it is possible to indicate the information processing apparatus to move a cursor or a display on a display screen of the information processing apparatus in the same direction as the enclosure 303.

As is evident from the operation determination table 1201, the operation determining unit 104 can indicate any of 7 operations for one sensor, by distinguishing high frequency and low frequency based on data given from the user action analyzing unit 103 and further distinguishing no motion ("0"), positive direction, negative direction, and positive-negative continuity based on data given from the motion analyzing unit 102. Accordingly, when two sensors are mounted in the operation indication outputting device, the operation determining unit 104 can have a choice of 49 operation indications at the maximum.

In the present embodiment, however, to establish intuitive correspondence between the user's action and an operation of the information processing apparatus, 16 operation indications are provided that are made up of move indications (up, down, right, upper right, lower right, left, upper left, lower left, previous page, next page, top page), display indications (zoom in, zoom out), and commands (cancel operation, reexecute operation, select).

Figure 13:
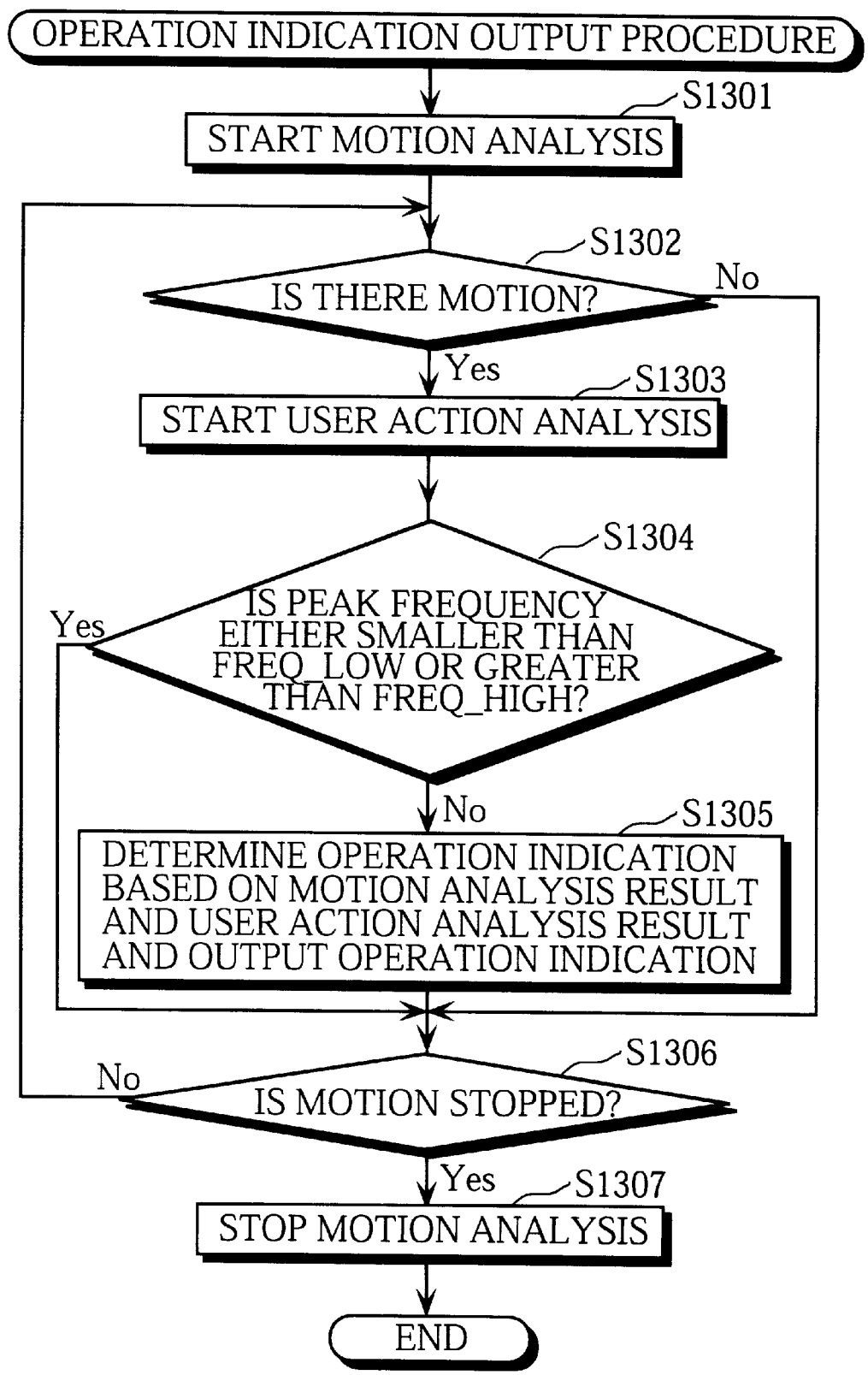
FIG. 13 is a flowchart showing the overall operation of the operation indication outputting device.

The overall operation of the operation indication outputting device of the first embodiment is explained below with reference to FIG. 13.

Prompted by the user pressing the button 308 or the like, the motion detecting unit 101 starts motion detection and the motion analyzing unit 102 is instructed to commence motion analysis (S1301).

The motion analyzing unit 102 judges whether there is a motion (S1302). If there is a motion, the motion analyzing unit 102 instructs the user action analyzing unit 103 to start user action analysis (S1303). Otherwise, the procedure proceeds to step S1306.

On instructed to start the user action analysis, the user action analyzing unit 103 analyzes a frequency distribution and judges whether a peak value in the frequency distribution is below FREQ_LOW and whether the peak value is above FREQ_HIGH (S1304). If the peak value is either smaller than FREQ_LOW or greater than FREQ_HIGH, the procedure proceeds to step S1306. With this judgement, a malfunction of outputting a wrong operation indication is avoided when the enclosure 303 is accidentally dropped or bumped against something.

If the peak value is neither smaller than FREQ_LOW nor greater than FREQ_HIGH, the operation determining unit 104 determines the contents of an operation indication based on the motion analysis result and user action analysis result and outputs the determined operation indication to the information processing apparatus (S1305).

The motion detecting unit 101 judges whether the motion is stopped (S1306). If the motion has not been stopped, the procedure returns to step S1302. Otherwise, the motion detecting unit 101 instructs the motion analyzing unit 102 to stop the motion analysis (S1307) to complete the procedure.

Figure 14:
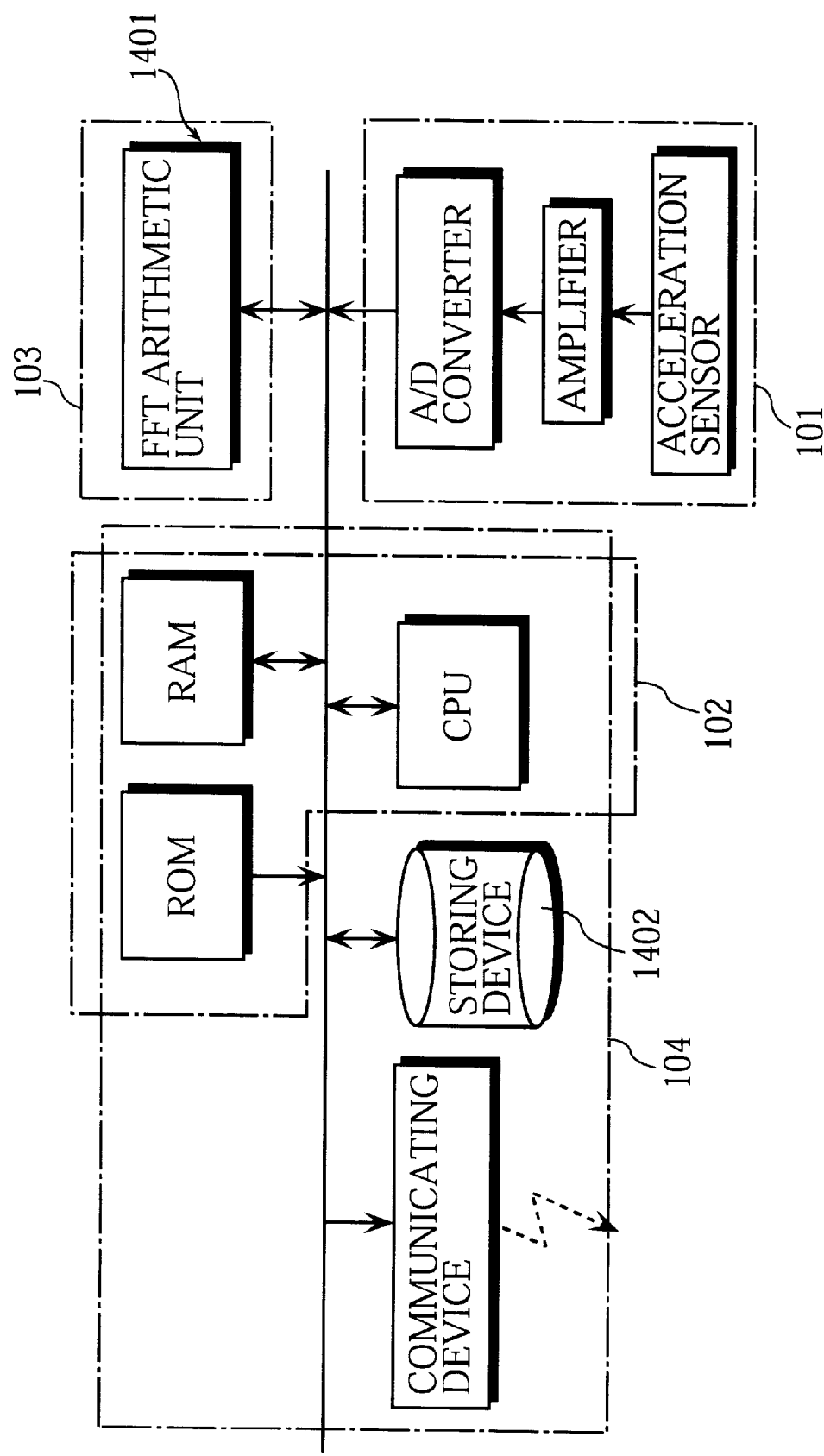
FIG. 14 shows the hardware construction of a variant of the first embodiment.

While in the above embodiment the user action analyzing unit 103 has been implemented via the CPU 204 according to the program for performing a FFT in the ROM 205, the FFT may be performed concurrently with the motion analysis of the motion analyzing unit 102, by equipping a FFT arithmetic unit 1401 in the operation indication outputting device as shown in FIG. 14.

Also, while the operation determination table 1201 has been stored in the ROM 205 in advance in the above embodiment, the operation determination table 120 may instead be stored in a storing device 1402 included in the operation determining unit 104 so that each user can set and dynamically change the contents of the table independently.

Though the operation determining unit 104 has sorted a peak frequency notified from the user action analyzing unit 103 as high frequency or low frequency in the above embodiment, the peak frequency may instead be sorted under three categories to further diversify operation indications.

Though the operation determining unit 104 has checked only a sign of MaxSum notified from the motion analyzing unit 102 in the above embodiment, the operation determining unit 104 may also check an absolute value of MaxSum to incorporate strength of the user's action into criteria for determining an operation indication.

Figure 15:
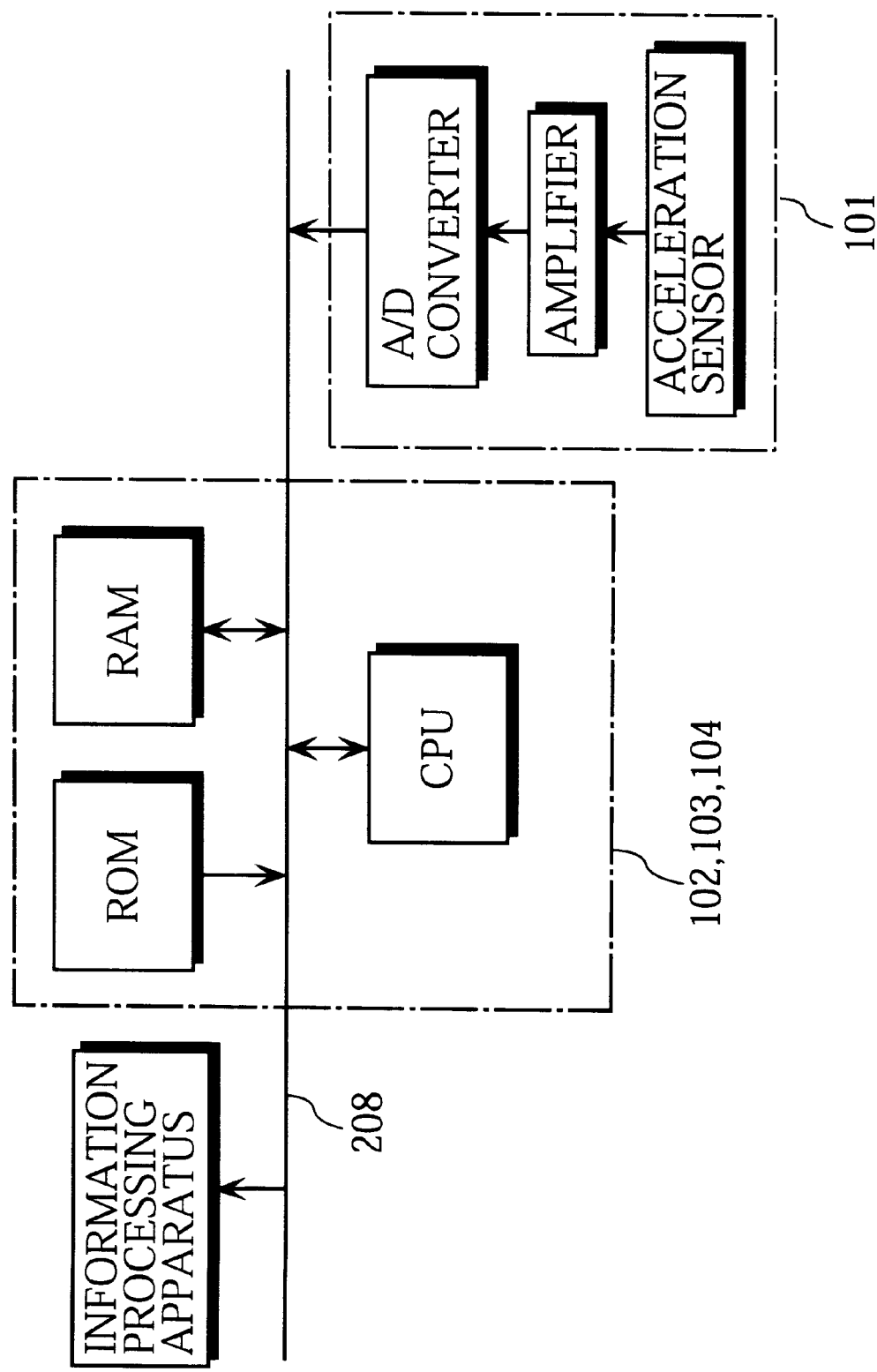
FIG. 15 shows the hardware construction of a variant of the first embodiment.

While an operation indication has been outputted from the communicating device 207 to the information processing apparatus in the hardware construction in FIG. 2, it is also possible to connect the bus 208 to the information processing apparatus to control the display screen and the like of the information processing apparatus, as shown in FIG. 15.

In the above embodiment, the user action analyzing unit 103 has prohibited the operation determining unit 104 to output an operation indication when a peak frequency is above FREQ_HIGH on the high frequency side. At this point, MaxSum analyzed by the motion analyzing unit 102 corresponding to the peak frequency may be stored as a record on accidents of the operation indication outputting device. By keeping such a record, it is possible to analyze a cause of a failure of the operation indication outputting device in the event of the device being dropped or bumped against something.

Second Embodiment

The following is a description of an operation indication outputting device of the second embodiment of the present invention. This operation indication outputting device has a configuration similar to the first embodiment, except that the user action analyzing unit 103 here does not perform a FFT but calculates the amount of change in acceleration level to determine a type of the user's action.

Figure 16:
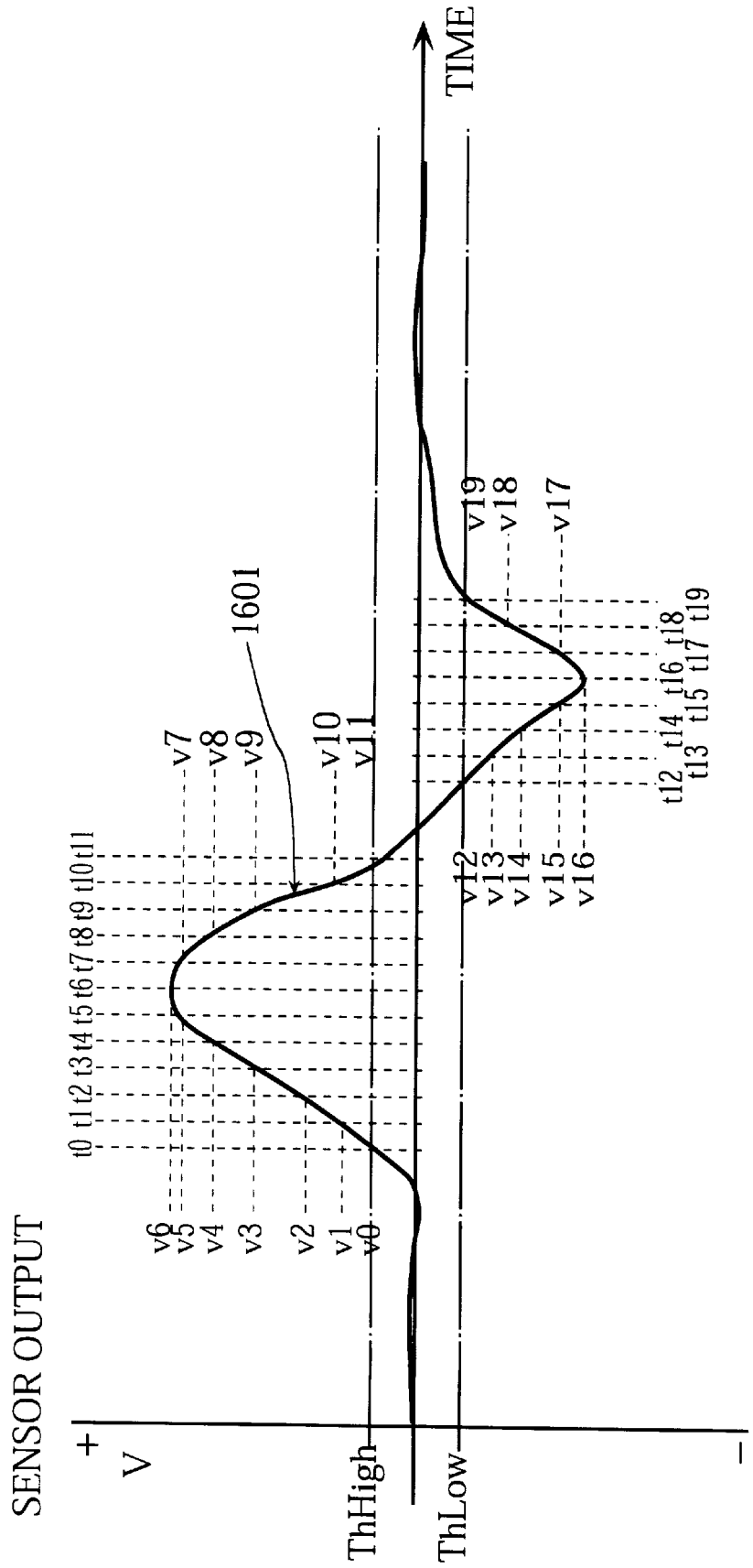
FIG. 16 shows the details of user action analysis by the user action analyzing unit 103 of the operation indication outputting device in the second embodiment of the present invention.

The user action analyzing unit 103 acquires time series data (acceleration curve) 1601 of acceleration levels shown in FIG. 16 from the motion detecting unit 101 and calculates a mean value of a sequence of differential values dv/dt that each represent the amount of change in acceleration level per unit of time. When the absolute value of an acceleration level exceeds the error level (i.e. when the acceleration level is either greater than ThHigh on the plus side or smaller than ThLow on the minus side), voltage v proportional to the acceleration level is outputted from the motion detecting unit 101 at certain sampling intervals (such as 2 msec). Which is to say, dt is constant, so that in each sampling the absolute difference (|v1–v0|, |v2–v1|, |v3–v2|, . . . , |v19–v18|) in acceleration level (voltage) is calculated and a mean value of the calculated absolute differences is revealed to the operation determining unit 104. Provided n sampling points are present within one sequence for which user action analysis is executed, output D is found as follows:

$$D = \frac{\sum_{i=0}^{n-2} |Vi+1 - Vi|}{n-1}$$ (Equation 1)

(where n>1)

When a sequence of acceleration levels outputted from the motion detecting unit 101 forms a gentle acceleration curve as in FIG. 4A, mean value D of differential values calculated in Equation 1 is small, while when the sequence of acceleration levels forms a sharp acceleration curve as in FIG. 4B, mean value D of differential values calculated in Equation 1 is large. The operation determining unit 104 compares differential mean value D outputted from the user action analyzing unit 103 with a predetermined value to judge whether the user's action belongs to low frequency of slowly swinging the enclosure 303 or high frequency of tapping the enclosure 303. Based on this judgement, the operation determining unit 104 specifies an operation indication in the operation determination table 1201 in FIG. 12.

Here, if differential mean value D calculated in Equation 1 is below predetermined threshold value ACCEL_LOW or above predetermined threshold value ACCEL_HIGH, the user action analyzing unit 103 prohibits the operation determining unit 104 to output an operation indication. ACCEL_LOW and ACCEL_HIGH respectively correspond to FREQ_LOW and FREQ_HIGH in the first embodiment and are used for preventing the output of a wrong operation indication caused by noise or the user dropping or bumping the enclosure 303.

ACCEL_LOW and ACCEL_HIGH are set with reference to a maximum output value of the acceleration sensor 301/302. For instance, setting ⅒ and ⁷⁄₁₀ of the maximum output value respectively as ACCEL_LOW and ACCEL_HIGH can cancel operation indication output processing for an extremely slow or intense motion.

Figure 17:
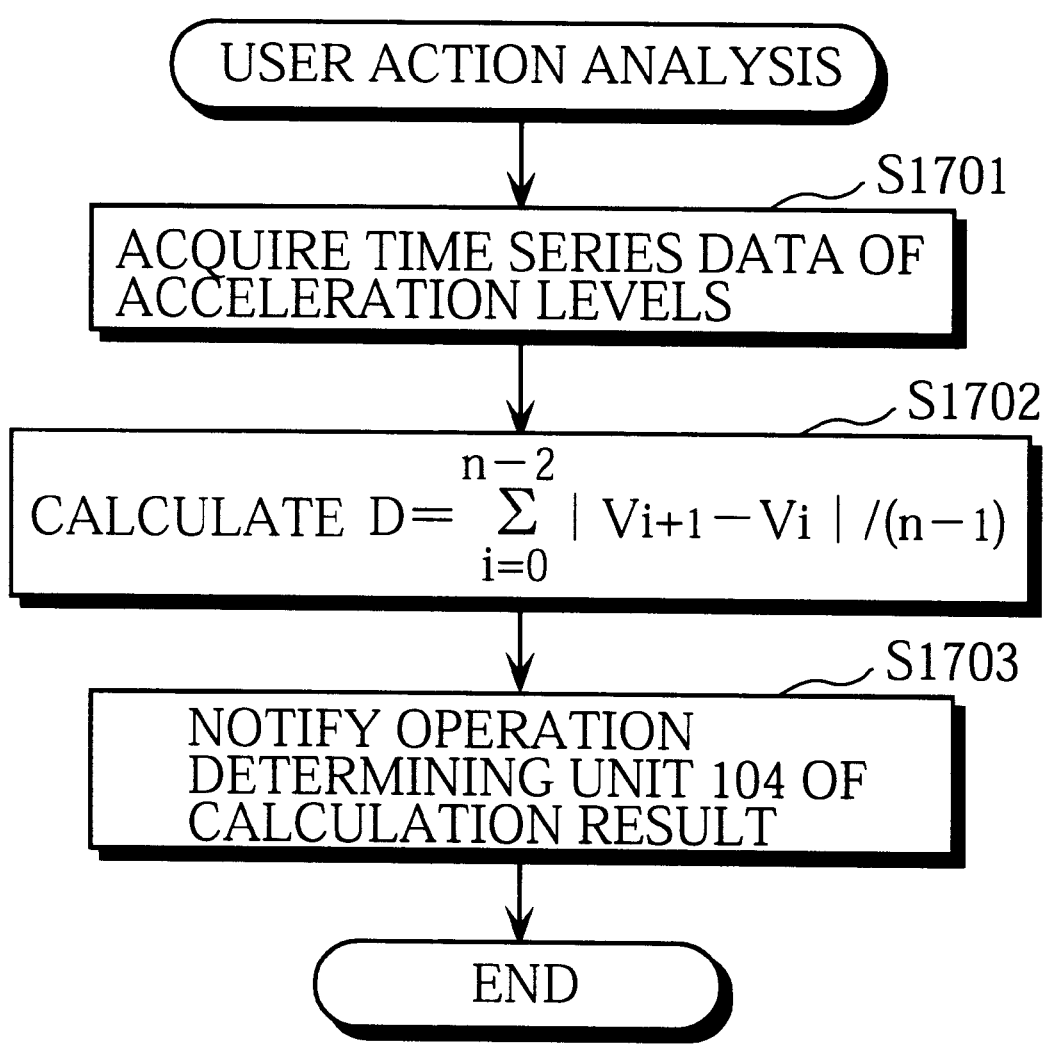
FIG. 17 is a flowchart showing the user action analysis by the user action analyzing unit 103 of the second embodiment.

The user action analysis by the user action analyzing unit 103 of the present embodiment is explained below with reference to FIG. 17.

The user action analyzing unit 103 acquires time series data of acceleration levels (S1701), calculates mean value D of differential values according to Equation 1 (S1702), and gives mean value D to the operation determining unit 104 (S1703), before completing the analysis procedure.

The overall operation of the operation indication outputting device of the second embodiment differs with the first embodiment shown in FIG. 13 only in that in step S1304 the user action analyzing unit 103 judges whether differential mean value D is below ACCEL_LOW and whether differential mean value D is above ACCEL_HIGH.

Third Embodiment

The following is a description of an operation indication outputting device of the third embodiment of the present invention. Though this operation indication outputting device has roughly the same configuration as the first embodiment, the analysis method used by the user action analyzing unit 103 differs with the first embodiment. While in the first embodiment the user action analyzing unit 103 has performed a FFT on an acceleration curve outputted from the motion detecting unit 101 to obtain a frequency distribution, in the third embodiment the user action analyzing unit 103 performs a wavelet transform to analyze whether an acceleration curve outputted from the motion detecting unit 101 is made up of high frequency components or low frequency components, the analysis result then being given to the operation determining unit 104.

A wavelet transform is a kind of filter that extracts only a waveform similar to a predetermined waveform. For details on the wavelet transform, see C. K. Chui (1997) *Wavelets: A Mathematical Tool for Signal Analysis* published by Society for Industrial & Applied Mathematics.

Figure 18:
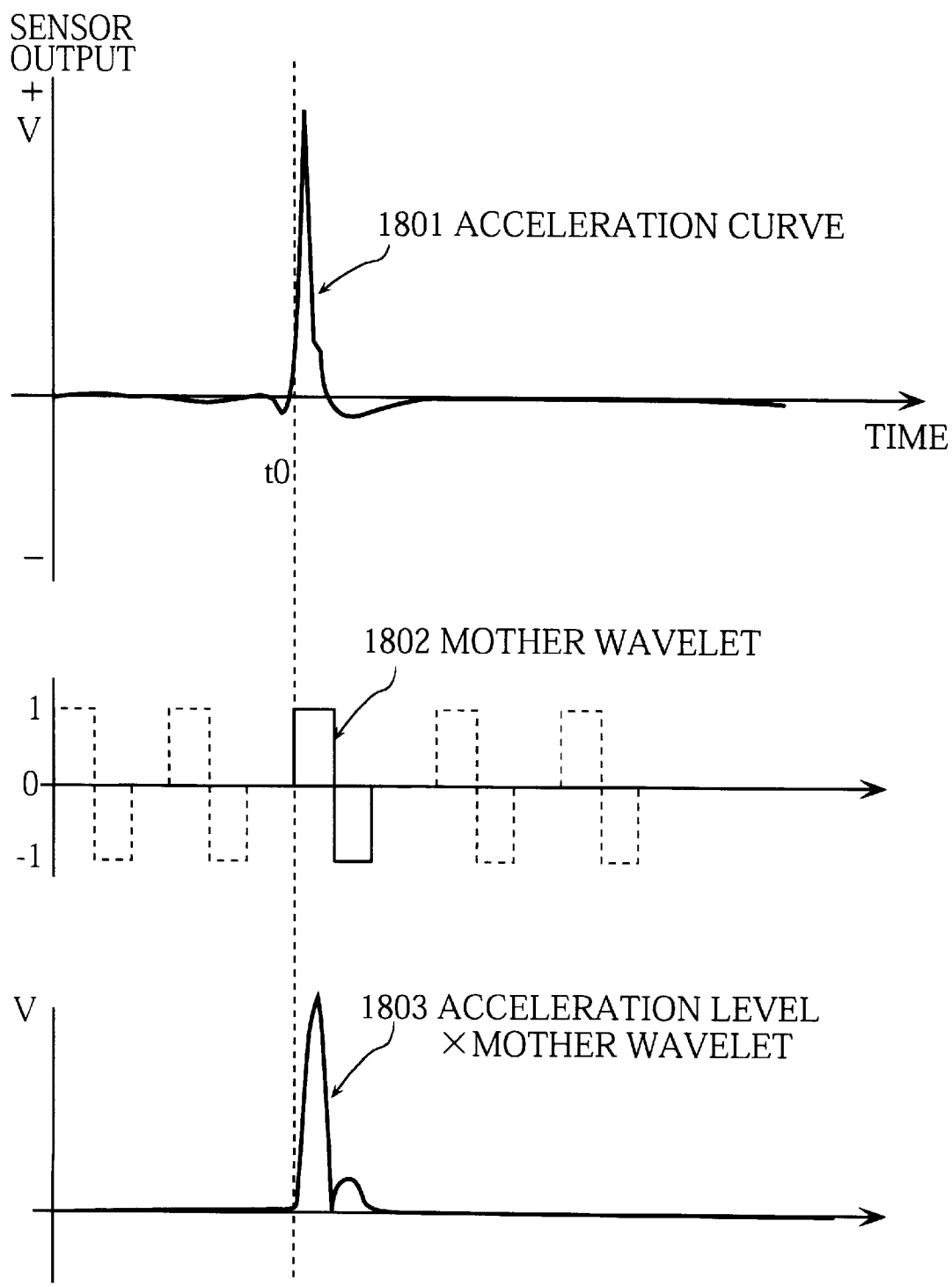
FIG. 18 shows the process of a wavelet transform performed by the user action analyzing unit 103 of the operation indication outputting device in the third embodiment of the present invention.

The wavelet transform is exemplified below with reference to FIG. 18.

In the figure, on receiving acceleration curve 1801 from the motion detecting unit 101, the user action analyzing unit 103 parallelly moves mother wavelet 1802 of detection target frequency (such as 100 Hz) in the time axis and calculates product 1803 of mother wavelet 1802 and each acceleration level. Here, a square wave is used as mother wavelet 1802. A waveform starting from time t0 in acceleration curve 1801 has a shape similar to mother wavelet 1802, so that a product of mother wavelet 1802 and each acceleration level of this waveform is of large positive value. If, on the other hand, a waveform of an acceleration curve greatly differs with mother wavelet 1802 such as in the case of an acceleration curve of a few hertz in frequency, both positive and negative products are found, so that summation of a sequence of such products yields a value close to 0, indicating that the acceleration curve does not have a waveform of the detection target frequency. In contrast, when a wavelet transform is performed using a mother wavelet of 5 Hz in frequency, a waveform of an acceleration curve of low frequency close to 5 Hz can be detected. Therefore, the user action analyzing unit 103 performs the analysis using a plurality of mother wavelets of high frequencies of around 100 Hz and a plurality of mother wavelets of low frequencies of around 5 Hz and outputs the analysis result to the operation determining unit 104.

Since a wavelet transform detects a strength and point of appearance of an acceleration curve, it can also be used for motion analysis by the motion analyzing unit 102. Also, if the user's action involves different frequencies such as when the user first swings the enclosure 303 which is a motion of low frequency and then taps the enclosure 303 which is a motion of high frequency, such an action by the user is analyzable with a wavelet transform, so that the operation determining unit 104 can appropriately determines an operation indication for such a combination of motions. Further, in conducting user action analysis the user action analyzing unit 103 may perform a wavelet transform to detect high frequencies and perform the differential method of the second embodiment to detect low frequencies. Also, frequency bands to be detected are not limited to a high frequency band and a low frequency band but three or more frequency bands may be targeted for detection depending on the processing capability of the operation determining unit 104. While the square wave has been used as the mother wavelet for performing a wavelet transform in this embodiment to reduce a calculation amount when multiplying the mother wavelet and the acceleration curve to be analyzed, instead the Daubechies wavelet may be used to improve detection accuracy.

Fourth Embodiment

The following is a description of an operation indication outputting device of the fourth embodiment of the present invention. Although the configuration of this operation indication outputting device is similar to the first embodiment, the main difference lies in that the motion analyzing unit 102 and the user action analyzing unit 103 exchange their analysis results in the fourth embodiment. The following description focuses on the difference with the other embodiments.

The motion analyzing unit 102 compares each acceleration level sequentially outputted from the motion detecting unit 101 with a predetermined reference value. The motion analyzing unit 102 then analyzes a direction of a motion based on a sign (plus/minus) of an acceleration level that first exceeds the reference value, and further analyzes a strength of the motion by calculating a period during which acceleration levels are above the reference value.

The user action analyzing unit 103 specifies a type of the user's action such as "swing" or "tap", based on the period during which the acceleration levels are above the reference value.

While the motion analyzing unit 102 in the first embodiment has evaluated the integral of acceleration levels outputted from the motion detecting unit 101, in the present embodiment a strength of a motion is analyzed by calculating a period during which acceleration levels are above the reference value, so that it is unnecessary to calculate the integral of acceleration levels. Hence the A/D converter 203 in the motion detecting unit 101 shown in FIG. 2 can be replaced with an analog comparator.

Figure 19:
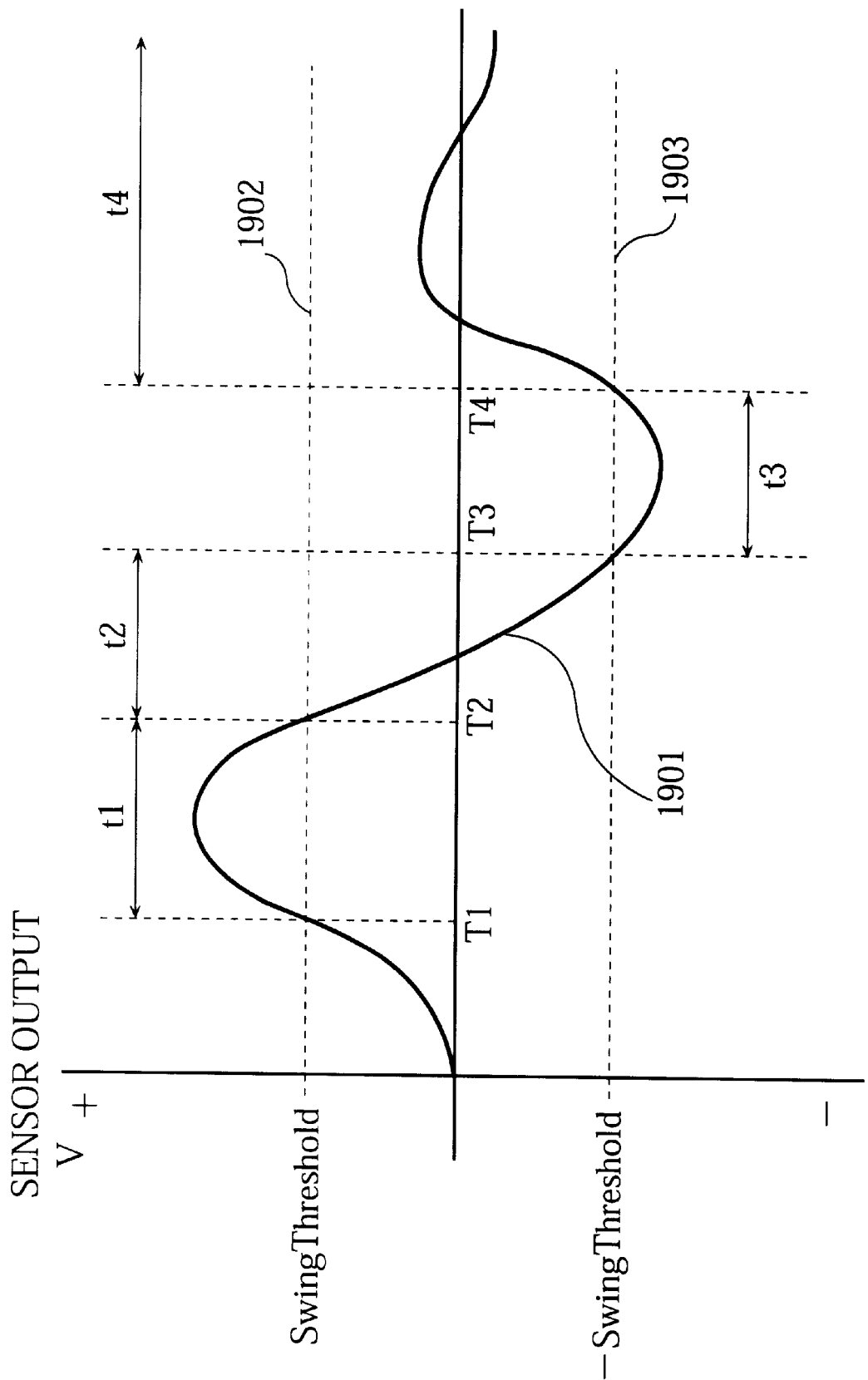
FIG. 19 shows an acceleration curve outputted from the motion detecting unit 101 of the operation indication outputting device in the fourth embodiment of the present invention when the user swings the operation indication outputting device once.
Figure 20:
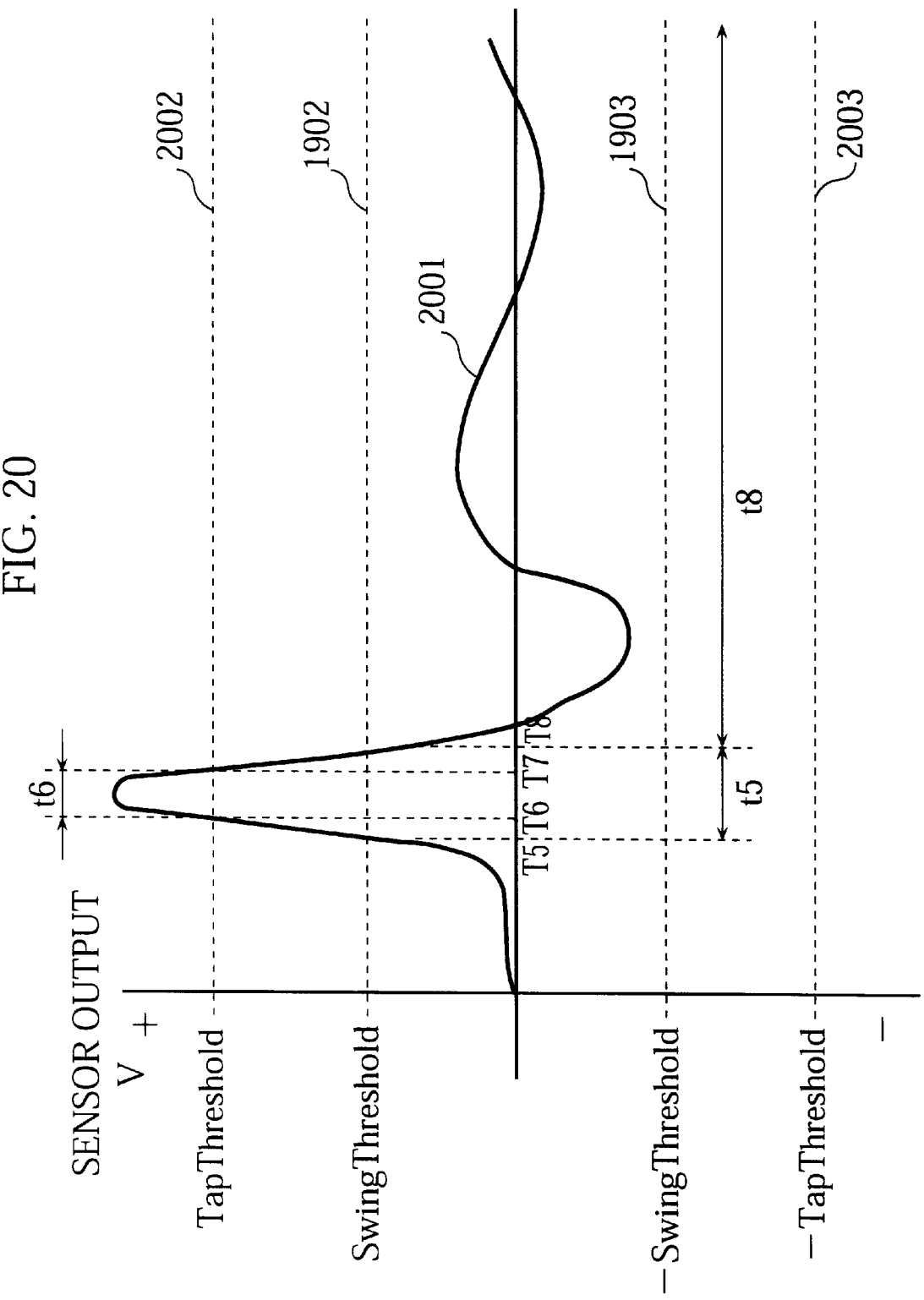
FIG. 20 shows an acceleration curve outputted from the motion detecting unit 101 when the user taps the operation indication outputting device once.

The procedure of the motion analyzing unit 102 and user action analyzing unit 103 of the fourth embodiment is explained below with reference to FIGS. 19 and 20. FIG. 19 shows acceleration curve 1901 outputted, for instance, from the acceleration sensor 302 when the enclosure 303 is swung once in the positive direction of the detection axis 306 and then stopped. FIG. 20 shows acceleration curve 2001 outputted, for instance, from the acceleration sensor 302 when the enclosure 303 is tapped once in the positive direction of the detection axis 306.

In these figures, the vertical axis represents voltage outputted from the acceleration sensor 302, while the horizontal axis represents time.

First reference value ±SwingThreshold shown by broken lines 1902 and 1903 in FIG. 19 denotes a voltage corresponding to an acceleration level which is normally exceeded when the user swings the enclosure 303. This reference value is set to correspond to 1 G (G denotes the acceleration of gravity) in this embodiment, although the value may be changed by the user or the operation indication outputting device itself. Since a voltage outputted from the acceleration sensor 302 is proportional to an acceleration level, the voltage is multiplied by a certain scale factor to get a value corresponding to 1 G.

First reference value ±SwingThreshold shown by broken lines 1902 and 1903 in FIG. 20 is the same as ±SwingThreshold in FIG. 19. Second reference value ±TapThreshold shown by broken lines 2002 and 2003 in FIG. 20 denotes a voltage corresponding to an acceleration level which is normally exceeded when the user taps the enclosure 303. This reference value is set to correspond to 2.5 G in this embodiment, although the value may be changed by the user or the operation indication outputting device itself.

TapThreshold is set to be larger than SwingThreshold, so that the absolute value of an acceleration level when the user swings the enclosure 303 never exceeds TapThreshold.

When acceleration curve 1901 shown in FIG. 19 is outputted from the motion detecting unit 101, the motion analyzing unit 102 and the user action analyzing unit 103 operate as follows.

The motion analyzing unit 102 sequentially receives acceleration levels represented by acceleration curve 1901 from the motion detecting unit 101 at established time intervals of 2 msec for example, and judges whether the absolute value of a received acceleration level exceeds SwingThreshold. On judging that the absolute value of an acceleration level exceeds SwingThreshold at time T1, the motion analyzing unit 102 starts measuring a period during which SwingThreshold is exceeded, and in the meantime analyzes a direction of a motion based on a sign (plus in this example) of the acceleration level at time T1. The motion analyzing unit 102 also judges whether the absolute value of an acceleration level exceeds TapThreshold (see FIG. 20) which is larger than SwingThreshold. Since a type of the user's action associated with acceleration curve 1901 is "swing", there is no acceleration level whose absolute value exceeds TapThreshold in FIG. 19.

Subsequently, on judging that the absolute value of an acceleration level becomes below SwingThreshold at time T2, the motion analyzing unit 102 analyzes a strength of the motion based on period t1 from T1 to T2 during which SwingThreshold is exceeded. The motion analyzing unit 102 then reveals period t1 to the user action analyzing unit 103 and notifies the user action analyzing unit 103 that the absolute value of the acceleration level has become below SwingThreshold.

After time T2 the motion analyzing unit 102 continues to judge whether the absolute value of an acceleration level received from the motion detecting unit 101 exceeds SwingThreshold. On judging that the absolute value of an acceleration level exceeds SwingThreshold at time T3, the motion analyzing unit 102 notifies the user action analyzing unit 103 of this judgement.

SwingThreshold is exceeded during period t3 from time T3 to time T4, in spite of which period t3 is not measured this time, since acceleration levels during this period derive from inverse acceleration caused when the user stopped moving the enclosure 303. Then, on judging that the absolute value of an acceleration level becomes below SwingThreshold at time T4, the motion analyzing unit 102 notifies the user action analyzing unit 103 of this judgement.

Since acceleration curve 1901 in FIG. 19 originates from the user's action of swinging the enclosure 303 once, after T2 there is no acceleration level whose absolute value exceeds SwingThreshold apart from those caused by the inverse acceleration. However, if an acceleration level whose absolute value is above SwingThreshold appears after T4, such an acceleration level is analyzed in counting the number of times the user swings the enclosure 303.

On instructed by the user action analyzing unit 103 to pass the above analysis result to the operation determining unit 104, the motion analyzing unit 102 reveals the direction, strength, and number of occurrence of the motion to the operation determining unit 104.

When notified by the motion analyzing unit 102 that the absolute value of the acceleration level has become below SwingThreshold at time T4, the user action analyzing unit 103 measures period t4 up to a point when the motion analyzing unit 102 notifies that SwingThreshold is exceeded again or a point when a predetermined period elapses. The predetermined period, such as 100 msec, is a period sufficient for assuming that there is no more action such as "swing" or "tap" by the user.

Once the predetermined period has lapsed since time T4, the user action analyzing unit 103 analyzes a type of the user's action based on the period, notified by the motion analyzing unit 102, during which SwingThreshold or TapThreshold is exceeded. Concurrently, the user action analyzing unit 103 instructs the motion analyzing unit 102 to reveal the analysis result such as the direction of the motion to the operation determining unit 104.

If notified by the motion analyzing unit 102 that both SwingThreshold and TapThreshold were exceeded, the user action analyzing unit 103 primarily judges the type of the user's action as "tap", since an acceleration curve generated as a result of the user tapping the enclosure 303 exceeds both TapThreshold and SwingThreshold without exception.

In the case of acceleration curve 1901 in FIG. 19, the user action analyzing unit 103 is notified by the motion analyzing unit 102 that SwingThreshold was exceeded and of period t1 during which SwingThreshold was exceeded. Accordingly, once the predetermined period such as 100 msec has elapsed from time T4, the user action analyzing unit 103 analyzes the type of the user's action as "swing" and notifies the operation determining unit 104 of the analysis result.

Here, if a period during which SwingThreshold was exceeded is shorter than a fixed first period such as 10 msec or a period during which TapThreshold was exceeded is longer than a fixed second period such as 20 msec, the user action analyzing unit 103 does not inform the type of the user's action but notifies the operation determining unit 104 of occurrence of a malfunction. Similarly, if the period during which SwingThreshold is exceeded is longer than a fixed third period such as 400 msec, the user action analyzing unit 103 notifies the operation determining unit 104 of occurrence of a malfunction instead of informing the type of the user's action.

The first period is used here to avoid mistakenly outputting an operation indication when short vibrations which are not intended by the user occur. The third period is used to avoid mistakenly outputting an operation indication when the operation indication outputting device is in a running car or the like with continuous acceleration of a few seconds. Equally, the second period is used to avoid mistakenly outputting an operation indication in the event of an accident or breakdown of the operation indication outputting device, since a period during which TapThreshold is exceeded when the user taps the enclosure 303 with his or her finger(s) is normally in the domain of around a few milliseconds to 10 milliseconds.

When, on the other hand, acceleration curve 2001 in FIG. 20 is outputted from the motion detecting unit 101, the motion analyzing unit 102 and the user action analyzing unit 103 operate as follows.

The motion analyzing unit 102 sequentially receives acceleration levels represented by acceleration curve 2001 from the motion detecting unit 101 and judges whether the absolute value of a received acceleration level exceeds SwingThreshold. On judging that the absolute value of an acceleration level exceeds SwingThreshold at time T5, the motion analyzing unit 102 starts measuring a period during which SwingThreshold is exceeded. The motion analyzing unit 102 also analyzes a direction of a motion based on a sign (plus in this example) of the acceleration level at time T5.

Next, the motion analyzing unit 102 judges whether the absolute value of an acceleration level exceeds TapThreshold. On judging that the absolute value of an acceleration level exceeds TapThreshold at time T6, the motion analyzing unit 102 starts measuring a period during which TapThreshold is exceeded. During the measurement of this period, the motion analyzing unit 102 stops measuring the period during which SwingThreshold is exceeded. On judging that the absolute value of an acceleration level becomes below TapThreshold at time T7, the motion analyzing unit 102 reveals period t6 during which TapThreshold was exceeded to the user action analyzing unit 103. The motion analyzing unit 102 then resume measuring the period during which SwingThreshold is exceeded until time T8, the measured period thus being the difference of subtracting period t6 from period t5. Although this period (t5–t6) is revealed to the user action analyzing unit 103 along with the notification that the absolute value of an acceleration level has become below SwingThreshold at time T8, the user action analyzing unit 103 does not use this period for analyzing a type of the user's action. After time T8, there is no acceleration level whose absolute value exceeds SwingThreshold in FIG. 20. On instructed by the user action analyzing unit 103 to notify the above analysis result to the operation determining unit 104, the motion analyzing unit 102 reveals the direction and strength of the motion to the operation determining unit 104. When two periods, namely a period during which SwingThreshold is exceeded and a period during which TapThreshold is exceeded, are measured as in the present case, only the direction and strength corresponding to the period t6 during which TapThreshold was exceeded are revealed to the operation determining unit 104.

On notified by the motion analyzing unit 102 that the absolute value of the acceleration level has decreased below SwingThreshold at time T8, the user action analyzing unit 103 measures period t8 up to a point when the motion analyzing unit 102 notifies that SwingThreshold is exceeded again or a point when the predetermined period elapses. If the predetermined period elapses while there is no notification from the motion analyzing unit 102 that SwingThreshold is exceeded again, the user action analyzing unit 103 instructs the motion analyzing unit 102 to announce the analysis result to the operation determining unit 104.

Meanwhile, the user action analyzing unit 103 makes sure that revealed period t6 during which TapThreshold was exceeded is not longer than the second period, and notifies the operation determining unit 104 that the type of the user's action is "tap".

The operation determining unit 104 reads an appropriate operation indication from the operation determination table 1201 based on the analysis results given from the motion analyzing unit 102 and user action analyzing unit 103 and outputs the read operation indication to the information processing apparatus via the communicating device 207, in the same way as the first to third embodiments. Note that in the present embodiment "low frequency" and "high frequency" (such as 1202 and 1203) in the operation determination table 1201 are replaced respectively with "swing" and "tap".

Also, if notified by the user action analyzing unit 103 of occurrence of a malfunction, the operation determining unit 104 does not read an operation indication from the operation determination table 1201 even when it has received an analysis result from the motion analyzing unit 102.

Figure 21:
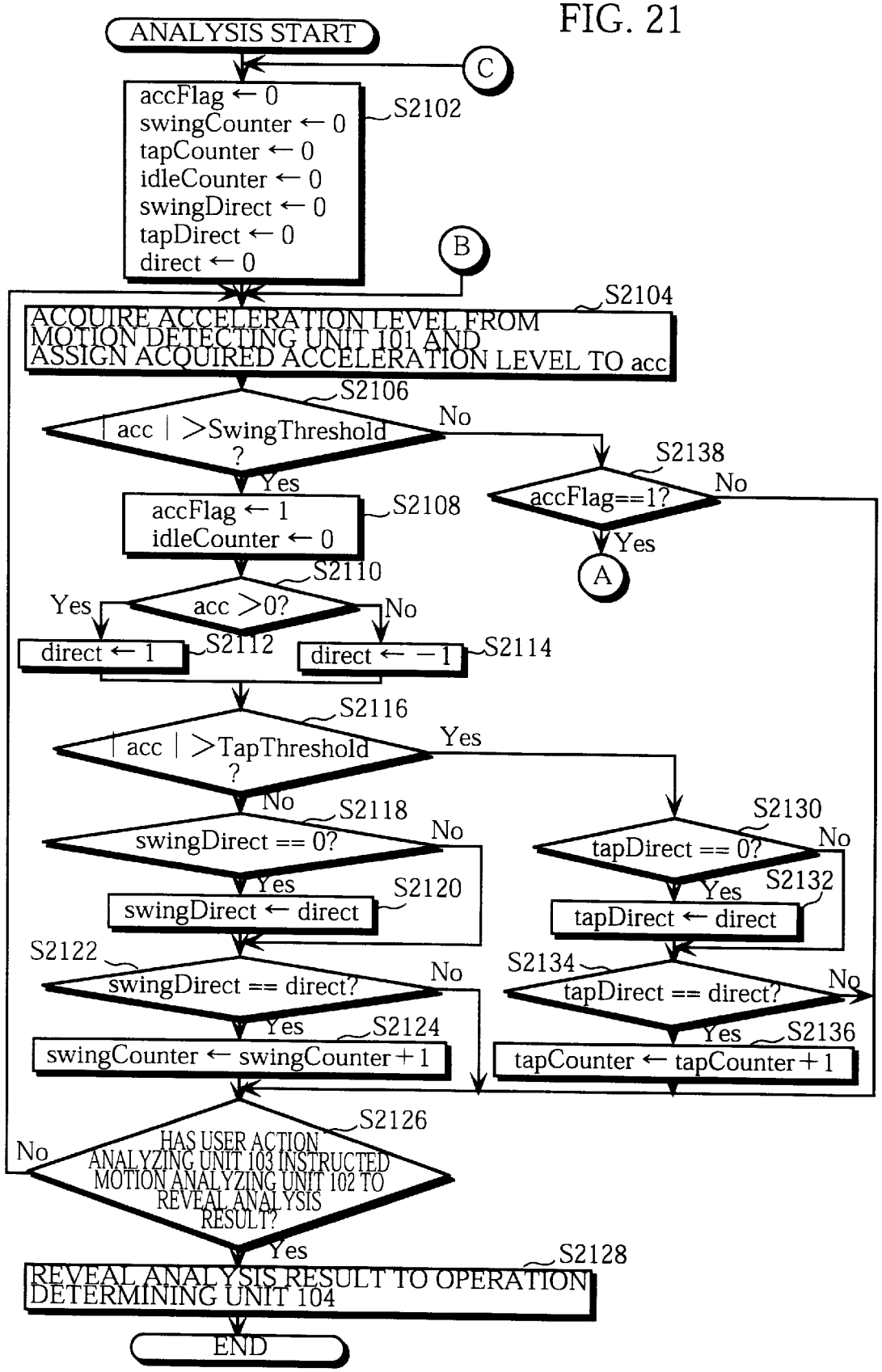
FIG. 21 is a flowchart showing motion analysis by the motion analyzing unit 102 in the fourth embodiment.
Figure 22:
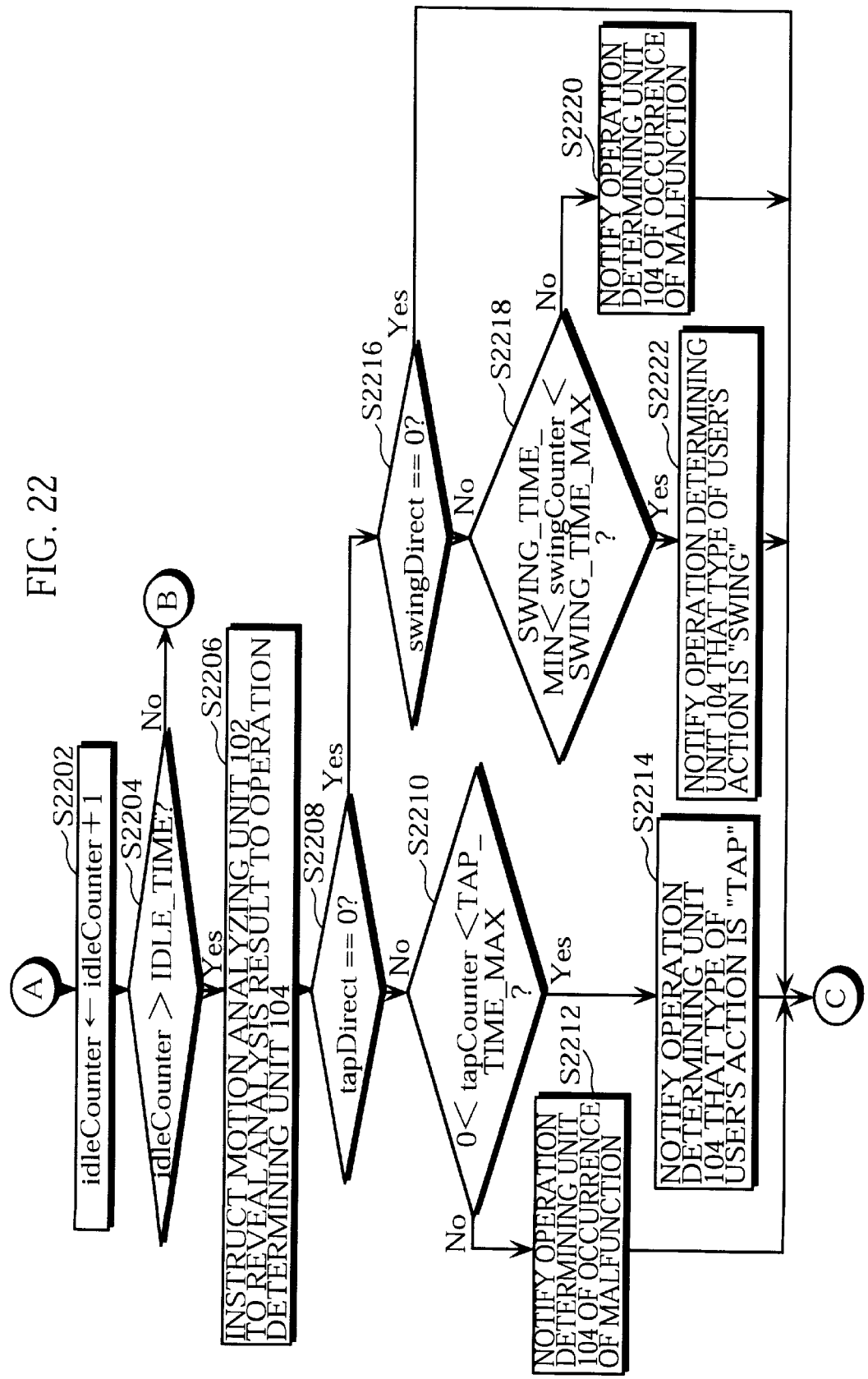
FIG. 22 is a flowchart showing user action analysis by the user action analyzing unit 103 in the fourth embodiment.

The procedure by the motion analyzing unit 102 and user action analyzing unit 103 of the fourth embodiment is explained below with reference to FIGS. 21 and 22.

First, the motion analyzing unit 102 initializes each of the following variables to 0 (S2102).

Variable accFlag shows whether the absolute value of an acceleration level outputted from the motion detecting unit 101 exceeds a predetermined reference value such as SwingThreshold.

Variable swingcounter is used to measure a period during which SwingThreshold is exceeded. Since an acceleration level is outputted per 2 msec in the present embodiment, doubling swingcounter yields a period in milliseconds during which SwingThreshold is exceeded.

Variable tapCounter is used to measure a period during which TapThreshold is exceeded. Doubling tapcounter yields a period in milliseconds during which TapThreshold is exceeded.

Variable idleCounter is actually held by the user action analyzing unit 103, in spite of which it is initialized concurrently with the variables of the motion analyzing unit 102. This variable is used to measure a period during which the reference value (SwingThreshold) is not exceeded after it was once exceeded. Doubling idlecounter yields a period in milliseconds during which the reference value is not exceeded.

Variable swingDirect shows a sign of an acceleration level starting from which SwingThreshold is exceeded, and is given a value of variable direct.

Variable tapDirect shows a sign of an acceleration level starting from which TapThreshold is exceeded, and is given a value of variable direct in the same way as swingDirect.

Variable direct shows a sign of an acceleration level starting from which a reference value is exceeded. When the sign of the acceleration level is plus, "1" is assigned to direct, while when the sign of the acceleration level is minus, "−1" is assigned to direct, thereby indicating a direction of a motion.

The motion analyzing unit 102 sequentially receives acceleration levels outputted from the motion detecting unit 101 per 2 msec and assigns a received acceleration level to variable acc that shows an acceleration level (S2104). The motion analyzing unit 102 then compares the absolute value of acc with first reference value SwingThreshold (S2106). If the absolute value of acc is above SwingThreshold, the motion analyzing unit 102 sets accFlag at 1 and simultaneously instructs the user action analyzing unit 103 to set idleCounter at 0 (S2108). The user action analyzing unit 103 accordingly sets idleCounter to 0.

The motion analyzing unit 102 next judges whether acc is larger than 0 (S2110). If acc is larger than 0, the motion analyzing unit 102 sets direct at 1 (S2112), while if acc is no larger than 0, direct is set at −1 (S2114).

The motion analyzing unit 102 further judges whether the absolute value of acc exceeds second reference value TapThreshold (S2116). When the absolute value of acc is no larger than TapThreshold, the motion analyzing unit 102 judges whether swingDirect is 0 (S2118). If swingDirect is 0, direct is assigned to swingDirect (S2120), while if swingDirect is not 0, it is judged whether swingDirect is equal to direct (S2122). When swingDirect is equal to direct, swingcounter is incremented by 1 (S2124), while when swingDirect is not equal to direct, the motion analyzing unit 102 judges whether instructed by the user action analyzing unit 103 to reveal an analysis result to the operation determining unit 104 (S2126). If the user action analyzing unit 103 has not yet instructed the motion analyzing unit 102 to reveal the analysis result, the procedure returns to step S2104. Otherwise, the motion analyzing unit 102 informs the operation determining unit 104 of swingDirect that shows a direction of a motion and swingcounter that shows a strength of the motion (S2128), and complete the procedure.

When judging in step S2116 that the absolute value of acc exceeds TapThreshold, the motion analyzing unit 102 judges whether tapDirect is 0 (S2130). If tapDirect is 0, direct is assigned to tapDirect (S2132), while if tapDirect is not 0, tapDirect is compared with direct (S2134). When tapDirect is equal to direct, tapcounter is incremented by 1 (S2136). Otherwise, the procedure proceeds to step S2126.

If in step S2106 the absolute value of acc is judged as not exceeding SwingThreshold, the motion analyzing unit 102 judges whether accFlag is 1 (S2138). When accFlag is not 1, the procedure proceeds to step S2126, while when accFlag is 1, the procedure shifts to the user action analyzing unit 103 at step S2202.

The user action analyzing unit 103 increments idleCounter by 1 (S2202) and judges whether idleCounter exceeds specified value IDLE_TIME (S2204). If idleCounter does not exceed IDLE_TIME, the procedure returns to step S2104. Otherwise, the user action analyzing unit 103 instructs the motion analyzing unit 102 to inform the operation determining unit 104 of the analysis result (S2206). IDLE_TIME referred to here represents a period sufficient for assuming that there is no longer an action such as "swing" or "tap" by the user. IDLE_TIME is set, for instance, at 50 corresponding to 100 msec.

The user action analyzing unit 103 then judges whether tapDirect is 0 (S2208). If tapDirect is not 0, it is judged whether tapcounter is larger than 0 and smaller than TAP_TIME_MAX that corresponds to the above second period (S2210). TAP_TIME_MAX is set, for instance, at 10 as acceleration levels are outputted per 2 msec from the motion detecting unit 101. When tapCounter is either no larger than 0 or no smaller than TAP_TIME_MAX, the user action analyzing unit 103 notifies the operation determining unit 104 of occurrence of a malfunction (S2212) and returns to step S2102. When, on the other hand, tapCounter is larger than 0 and smaller than TAP_TIME_MAX, the user action analyzing unit 103 notifies the operation determining unit 104 that the type of the user's action is "tap" (S2214), before returning to step S2102.

If it is judged in step S2208 that tapDirect is 0, the user action analyzing unit 103 judges whether swingDirect is 0 (S2216). When swingDirect is 0, the procedure returns to step S2102. Otherwise, the user action analyzing unit 103 judges whether swingcounter is larger than SWING_TIME_MIN corresponding to the above first period and smaller than SWING_TIME_MAX corresponding to the above third period (S2218). SWING_TIME_MIN and SWING_TIME_MAX are respectively set, for instance, at 5 and 200, given that acceleration levels are outputted per 2 msec from the motion detecting unit 101.

When in step S2218 swingcounter is either no larger than SWING_TIME_MIN or no smaller than SWING_TIME_MAX, the user action analyzing unit 103 notifies the operation determining unit 104 of occurrence of a malfunction (S2220) and returns to step S2102. Meanwhile, when swingcounter is larger than SWING_TIME_MIN and smaller than SWING_TIME_MAX, the user action analyzing unit 103 notifies the operation determining unit 104 that the type of the user's action is "swing" (S2222), before returning to step S2102.

While for ease of explanation the above embodiment has assumed that acceleration levels are outputted from one acceleration sensor, the procedure may also be performed with a plurality of acceleration sensors as in the first to third embodiments.

While in the above embodiment two reference values SwingThreshold and TapThreshold have been used to analyze whether a type of the user's action is "swing" or "tap", more reference values may be used to increase types of the user's actions to be analyzed. By doing so, operation indications outputted from the operation determining unit 104 can be further diversified.

In the above embodiment the user action analyzing unit 103 has judged occurrence of a malfunction when a period during which TapThreshold was exceeded is longer the second period. Alternatively, a value (e.g. 5 G) approximately corresponding to double TapThreshold may be set as a threshold value, so that when an acceleration level whose absolute value is above this threshold value is detected, the user action analyzing unit 103 judges the acceleration level as deriving from a malfunction caused by the user dropping or bumping the enclosure 303 against something. In the same way, when an acceleration level whose absolute value is below 1 G is detected, the user action analyzing unit 103 may judge the acceleration level as deriving from a malfunction.

While in the first to fourth embodiments the motion detecting unit 101 has used acceleration sensors, the motion detecting unit 101 may instead use angular acceleration sensors. Suppose the acceleration sensor 301 that detects acceleration in the detection axis 305 is replaced with an angular acceleration sensor. In such a case, when the user rotates the enclosure 303 by hand, angular acceleration of a rotary motion originated from the user's wrist is detected, with the detection axis 305 being the tangential direction.

Applications

The following are applications of the operation indication outputting device of the above embodiments.

1. Application to Mobile Phones

When the user swings or taps a mobile phone into which the operation indication outputting device is incorporated, the mobile phone can perform an operation such as follows according to an operation indication given from the operation indication outputting device.

(1) When the user taps the mobile phone twice which is emitting an incoming call sound, the mobile phone stops the sound and switches to manner mode (tapping the mobile phone just once may cause a malfunction).

(2) When the user taps the mobile phone twice which is emitting an alarm sound, the mobile phone stops the sound.

(3) When the user taps the mobile phone twice which is originating a call, the mobile phone stops the call. Thus, the user can swiftly cancel a call to a wrong number.

(4) To search a telephone directory registered in the mobile phone for a desired number, the mobile phone switches a display if swung, and calls to the desired number if tapped when the desired number is displayed.

(5) When the user swings and then taps the mobile phone which is displaying electronic mail or the like on its display screen, the mobile phone starts and then stops scrolling the display.

(6) An electronic pet displayed on the mobile phone does "shake" when the mobile phone is swung, and does "sit" when the mobile phone is tapped.

(7) A backlight color on the display screen of the mobile phone is changed when the mobile phone is swung.

(8) The mobile phone produces a different sound depending on how strong and in which direction the user swings the mobile phone and which part of the mobile phone the user taps on.

(9) The mobile phone generates random numbers when swung and stops generating the random numbers when tapped, thereby offering a kind of game.

(10) By sending information on the user's action of swinging or tapping the mobile phone to a call destination mobile phone, the mobile phone manipulates a display on a display screen of the call destination mobile phone, has the call destination mobile phone produce an effect sound, or has the call destination mobile phone vibrate.

2. Application to Portable Terminals (Computers)

When the user swings or taps a portable terminal into which the operation indication outputting device is incorporated, the portable terminal can perform an operation such as follows according to an operation indication given from the operation indication outputting device.

(1) A selection cursor on a menu displayed on the portable terminal is moved when the user swings the portable terminal, and stopped to select from the menu when the user taps the portable terminal.

(2) When the user wearing a wristwatch-type PDA (Personal Digital Assistance) swings his/her wrist from side to side, latest information is displayed on a display screen of the PDA.

3. Application to Remote Controllers

When the user swings or taps a remote controller into which the operation indication outputting device is incorporated, the remote controller can output an indication such as follows to a controlled apparatus according to an operation indication given from the operation indication outputting device.

(1) TV Remote Controller

A TV remote controller outputs a channel switch indication to a TV when swung from side to side, outputs a volume control indication when swung up and down, and outputs a power off indication when tapped twice.

(2) VCR Remote Controller

While tape is stopped in a VCR (videocassette recorder), a VCR remote controller outputs a play indication to the VCR when tapped, outputs a fast-forward indication when swung from side to side, and outputs a rewind indication when swung up and down.

While tape is being played in the VCR, the VCR remote controller outputs a stop indication to the VCR when tapped, outputs a fast-forward play indication when swung from side to side, and outputs a rewind play indication when swung up and down.

While tape is being rewound in the VCR, the VCR remote controller outputs a rewind stop indication to the VCR when tapped.

(3) Lighting Remote Controller

A lighting remote controller outputs a light amount control indication to the lighting when swung from side to side, and outputs a power off indication when tapped.

(4) MD (mini disk) Remote Controller

An MD remote controller outputs a power on indication or a power off indication to an MD when tapped twice, and outputs a track start search indication when swung from side to side.

It should be noted that while in the first to fourth embodiments the motion analyzing unit 102, user action analyzing unit 103, and operation determining unit 104 have performed their respective procedures according to the program stored in the ROM 205 in FIG. 2, this program may be recorded on a storing medium such as a CD-ROM or distributed on the Internet, with it being possible to incorporate the above described function of the present invention into an operation indication outputting device which by itself cannot distinguish types of the user's actions as the operation indication outputting device of the present invention.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. An operation indication outputting device for outputting an operation indication to an information processing apparatus to have the information processing apparatus perform processing based on the outputted operation indication, the operation indication outputting device comprising:

storing means for storing operation indications that each correspond to a combination of a type of a user's action and at least one of a direction, a strength, and a number of occurrence of a motion of the operation indication outputting device caused by the user's action;

motion detecting means for detecting a motion of the operation indication outputting device caused by the user's action;

motion analyzing means for analyzing at least one of a direction, a strength, and a number of occurrence of the detected motion;

user action analyzing means for analyzing a type of the user's action that causes the detected motion; and outputting means for reading, from the storing means, an operation indication corresponding to a combination of an analysis result by the motion analyzing means and an analysis result by the user action analyzing means, and outputting the read operation indication to the information processing apparatus.

2. The operation indication outputting device of claim 1, wherein the motion detecting means detects acceleration levels of the motion of the operation indication outputting device over time, and wherein the motion analyzing means analyzes at least one of the direction, the strength, and the number of occurrence of the motion by integrating, with respect to time, the acceleration levels outputted from the motion detecting means.

3. The operation indication outputting device of claim 2, wherein the user action analyzing means includes a fast Fourier transform analyzing unit for obtaining a frequency distribution by performing a fast Fourier transform on a curve produced by graphing the acceleration levels outputted from the motion detecting means against time, to analyze the type of the user's action.

4. The operation indication outputting device of claim 3, wherein the user action analyzing means further includes an output prohibiting unit for prohibiting the outputting means to output the operation indication if a peak value in the obtained frequency distribution is any of below a first frequency and above a second frequency.

5. The operation indication outputting device of claim 2, wherein the user action analyzing means includes a differential analyzing unit for differentiating, according to a predetermined equation, a curve produced by graphing the acceleration levels outputted from the motion detecting means against time, to analyze the type of the user's action.

6. The operation indication outputting device of claim 5, wherein the user action analyzing means further includes an output prohibiting unit for prohibiting the outputting means to output the operation indication if a mean value of differential values calculated by the differential analyzing unit is any of below a first threshold value and above a second threshold value.

7. The operation indication outputting device of claim 2, wherein the user action analyzing means includes a wavelet transform analyzing unit for detecting specific frequency components by performing a wavelet transform on a curve produced by graphing the acceleration levels outputted from the motion detecting means against time, to analyze the type of the user's action.

8. The operation indication outputting device of claim 7, wherein the storing means further stores operation indications that each correspond to an order of a plurality of types of the user's actions, wherein the user action analyzing means further includes an action sequence analyzing unit for analyzing types of the user's actions that cause the motion, according to an order in which the detected specific frequency components appear, and wherein the outputting means includes an order-corresponding operation indicating unit for reading, from the storing means, an operation indication corresponding to an order of the types of the user's actions analyzed by the action sequence analyzing unit, and outputting the read operation indication to the information processing apparatus.

9. The operation indication outputting device of claim 2, wherein the user action analyzing means includes a time analyzing unit for measuring, for each of a plurality of reference values, time during which the reference value is exceeded by absolute values of a sequence of acceleration levels among the acceleration levels outputted from the motion detecting means, to analyze the type of the user's action.

10. The operation indication outputting device of claim 9, wherein the user action analyzing means further includes an output prohibiting unit for prohibiting the outputting means to output the operation indication if at least one of absolute values of the outputted acceleration levels is any of below a first threshold value and above a second threshold value.

11. The operation indication outputting device of claim 1, wherein the motion detecting means detects acceleration levels of the motion of the operation indication outputting device over time, wherein for each of a plurality of reference values, when the reference value is exceeded by absolute values of a sequence of acceleration levels among the acceleration levels outputted from the motion detecting means, the motion analyzing means analyzes a sign of an acceleration level whose absolute value first exceeds the reference value in the sequence of acceleration levels, and measures time during which the reference value is exceeded by the absolute values of the sequence of acceleration levels, thereby analyzing at least one of the direction, the strength, and the number of occurrence of the motion, and wherein the user action analyzing means analyzes the type of the user's action based on the time measured by the motion analyzing means.

12. The operation indication outputting device of claim 11, wherein the plurality of reference values are made up of a first reference value and a second reference value larger than the first reference value, and wherein the user action analyzing means includes an output prohibiting unit for prohibiting the outputting means to output the operation indication, any of if time during which the first reference value is exceeded is shorter than predetermined first time and if time during which the second reference value is exceeded is longer than predetermined second time.

13. The operation indication outputting device of claim 12, wherein the first reference value is set at a value corresponding to an acceleration level which is to be detected when the user swings the operation indication outputting device, wherein the second reference value is set at a value corresponding to an acceleration level which is to be detected when the user taps the operation indication outputting device, and wherein the user action analyzing means analyzes whether the type of the user's action is "swing" or "tap".

14. The operation indication outputting device of claim 1, wherein the motion detecting means detects angular acceleration levels of the motion of the operation indication outputting device over time, and wherein the motion analyzing means analyzes at least one of the direction, the strength, and the number of occurrence of the motion by integrating, with respect to time, the angular acceleration levels outputted from the motion detecting means.

15. The operation indication outputting device of claim 14, wherein the user action analyzing means includes
a fast Fourier transform analyzing unit for obtaining a frequency distribution by performing a fast Fourier transform on a curve produced by graphing the angular acceleration levels outputted from the motion detecting means against time, to analyze the type of the user's action.

16. The operation indication outputting device of claim 1, wherein the motion detecting means detects angular acceleration levels of the motion of the operation indication outputting device over time, wherein for each of a plurality of reference values, when the reference value is exceeded by absolute values of a sequence of angular acceleration levels among the angular acceleration levels outputted from the motion detecting means, the motion analyzing means analyzes a sign of an angular acceleration level whose absolute value first exceeds the reference value in the sequence of angular acceleration levels, and measures time during which the reference value is exceeded by the absolute values of the sequence of angular acceleration levels, thereby analyzing at least one of the direction, the strength, and the number of occurrence of the motion, and wherein the user action analyzing means analyzes the type of the user's action based on the time measured by the motion analyzing means.

17. The operation indication outputting device of claim 16, wherein the plurality of reference values are made up of a first reference value and a second reference value larger than the first reference value, and wherein the user action analyzing means includes
an output prohibiting unit for prohibiting the outputting means to output the operation indication, any of if time during which the first reference value is exceeded is shorter than predetermined first time and if time during which the second reference value is exceeded is longer than predetermined second time.

18. The operation indication outputting device of claim 1, wherein the operation indication outputting device is incorporated into a mobile phone that is the information processing apparatus, and wherein a processing mode of the mobile phone is changed according to the operation indication outputted from the outputting means.

19. A mobile phone that incorporates an operation indication outputting device for outputting an operation indication to the mobile phone to have the mobile phone perform processing based on the outputted operation indication, the operation indication outputting device comprising:

storing means for storing operation indications that each correspond to a combination of a type of a user's action and at least one of a direction, a strength, and a number of occurrence of a motion of the operation indication outputting device caused by the user's action;

motion detecting means for detecting a motion of the operation indication outputting device caused by the user's action;

motion analyzing means for analyzing at least one of a direction, a strength, and a number of occurrence of the detected motion;

user action analyzing means for analyzing a type of the user's action that causes the detected motion; and outputting means for reading, from the storing means, an operation indication corresponding to a combination of an analysis result by the motion analyzing means and an analysis result by the user action analyzing means, and outputting the read operation indication to the mobile phone, wherein a processing mode of the mobile phone is changed according to the operation indication outputted from the outputting means.

20. A computer-readable storing medium storing a program executed by an operation indication outputting device that is equipped with a detecting unit for detecting a motion of the operation indication outputting device caused by a user's action and outputs an operation indication to an information processing apparatus to have the information processing apparatus perform processing based on the outputted operation indication, the program comprising:

a motion analyzing step for analyzing at least one of a direction, a strength, and a number of occurrence of the motion detected by the detecting unit;

a user action analyzing step for analyzing a type of the user's action that causes the detected motion; and an outputting step for reading, from an storing unit which stores operation indications that each correspond to a combination of a type of the user's action and at least one of a direction, a strength, and a number of occurrence of a motion of the operation indication outputting device caused by the user's action, an operation indication corresponding to a combination of an analysis result obtained in the motion analyzing step and an analysis result obtained in the user action analyzing step, and outputting the read operation indication to the information processing apparatus.

* * * * *